(12) United States Patent
Sharifi Mehr

(10) Patent No.: US 9,912,486 B1
(45) Date of Patent: Mar. 6, 2018

(54) COUNTERSIGNED CERTIFICATES

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/838,172

(22) Filed: Aug. 27, 2015

(51) Int. Cl.
*H04L 29/06* (2006.01)
*H04L 9/32* (2006.01)

(52) U.S. Cl.
CPC .......... *H04L 9/3268* (2013.01); *H04L 9/3247* (2013.01); *H04L 9/3265* (2013.01); *H04L 2209/38* (2013.01)

(58) Field of Classification Search
None
See application file for complete search history.

(56) References Cited

U.S. PATENT DOCUMENTS

| | | | | |
|---|---|---|---|---|
| 4,868,877 | A * | 9/1989 | Fischer | G06F 21/33 380/30 |
| 5,005,200 | A * | 4/1991 | Fischer | G06F 21/00 380/30 |
| 6,134,550 | A * | 10/2000 | Van Oorschot | G06F 21/33 |
| 7,219,223 | B1 | 5/2007 | Bacchus et al. | |
| 8,024,563 | B1 | 9/2011 | Belgaied et al. | |
| 9,065,820 | B2 * | 6/2015 | Leggette | G06F 3/0614 |
| 9,282,092 | B1 * | 3/2016 | Shankar | H04L 63/0823 |
| 9,491,619 | B2 | 11/2016 | Das et al. | |
| 2005/0021969 | A1 * | 1/2005 | Williams | H04L 9/3268 713/176 |

(Continued)

FOREIGN PATENT DOCUMENTS

WO    WO 2009/132668 A1 * 11/2009 ............. H04L 29/06

OTHER PUBLICATIONS

Taylor, D., et al., "Using the Secure Remote Password (SRP) Protocol for TLS Authentication," Request for Comments: 5054, Informational, Nov. 2007, 25 pages.

(Continued)

*Primary Examiner* — Christopher Revak
(74) *Attorney, Agent, or Firm* — Davis Wright Tremaine LLP

(57) ABSTRACT

A digital certificate for an entity is issued and signed by a certificate authority. One or more counter signing entities are identified in an extension to the digital certificate. Each countersigning entity adds a countersignature to the digital certificate using a private cryptographic key maintained by each countersigning entity. A client that receives the digital certificate validates the digital certificate by in part validating the digital signature of the issuing certificate authority and validating the digital signatures of the countersigning entities. In determining whether the digital certificate is valid, the client may consider the geographic regions, legal jurisdictions, and identity verification processes of the certificate authority and of the countersigning entities. In some examples, the client requires that the issuing certificate authority and the countersigning entities represent a minimum amount of geographic and jurisdictional diversity. In other examples, the client requires a minimum threshold number of countersigning entities.

20 Claims, 22 Drawing Sheets

(56) References Cited

U.S. PATENT DOCUMENTS

| | | | |
|---|---|---|---|
| 2005/0216733 A1* | 9/2005 | Keohane | H04L 63/0869 713/156 |
| 2006/0047949 A1* | 3/2006 | Brown | H04L 9/3265 713/156 |
| 2006/0053291 A1* | 3/2006 | Brown | H04L 9/3247 713/175 |
| 2007/0083763 A1* | 4/2007 | Itoh | H04L 9/3247 713/176 |
| 2007/0113074 A1* | 5/2007 | Ben-Menahem | H04L 63/0823 713/158 |
| 2007/0220259 A1* | 9/2007 | Pavlicic | G06Q 20/02 713/176 |
| 2007/0299921 A1* | 12/2007 | Brown | G06Q 10/107 709/206 |
| 2008/0021901 A1* | 1/2008 | Skaria | G06F 17/30233 |
| 2011/0305341 A1 | 12/2011 | Hahn et al. | |
| 2012/0216242 A1 | 8/2012 | Uner et al. | |
| 2012/0250866 A1 | 10/2012 | Matsuo | |
| 2013/0117558 A1* | 5/2013 | Metke | G06F 21/33 713/156 |
| 2013/0145153 A1* | 6/2013 | Brown | H04L 63/0823 713/156 |
| 2013/0232554 A1 | 9/2013 | Campagna et al. | |
| 2014/0032912 A1* | 1/2014 | Hardy | H04N 1/32144 713/176 |
| 2014/0041022 A1 | 2/2014 | Small et al. | |
| 2014/0195797 A1 | 7/2014 | du Toit | |
| 2014/0283105 A1* | 9/2014 | Trevor | G06F 21/10 726/27 |
| 2015/0188699 A1 | 7/2015 | Sung et al. | |
| 2015/0288514 A1 | 10/2015 | Pahl et al. | |
| 2016/0226827 A1 | 8/2016 | Bohannon | |

OTHER PUBLICATIONS

Salowey, J., et al., "Transport Layer Security (TLS) Session Resumption without Server-Side State," Request for Comments: 5077, Standards Track, Jan. 2008, 21 pages.
Mavrogiannopoulos, N., "Using OpenPGP Keys for Transport Layer Security (TLS) Authentication," Request for Comments: 5081, Experimental, Nov. 2007, 9 pages.
Phelan, T., "Datagram Transport Layer Security (DTLS) over the Datagram Congestion Control Protocol (DCCP)," Request for Comments: 5238, Standards Track, May 2008, 11 pages.
Dierks, T., and E. Rescorla, "The Transport Layer Security (TLS) Protocol Version 1.2," Request for Comments: 5246, Standards Track, Aug. 2008, 98 pages.
Cooper, D., et al., "Internet X.509 Public Key Infrastructure Certificate and Certificate Revocation List (CRL) Profile," Request for Comments: 5280, Standards Track, 141 pages.
Salowey, J., et al., "AES Galois Counter Mode (GCM) Cipher Suites for TLS," Request for Comments: 5288, Standards Track, Aug. 2008, 9 pages.
Rescorla, E., "TLS Elliptic Curve Cipher Suites with SHA-256/384 and AES Galois Counter Mode (GCM)," Request for Comments: 5289, Informational, Aug. 2008, 7 pages.
Igoe, K., and J. Solinas, "AES Galois Counter Mode for the Secure Shell Transport Layer Protocol," Request for Comments: 5647, Informational, Aug. 2009, 10 pages.
Stebiula, D., and J. Green, "Elliptic Curve Algorithm Integration in the Secure Shell Transport Layer," Request for Comments: 5656, Standards Track, Dec. 2009, 19 pages.
Rescorla, E., et al., "Transport Layer Security (TLS) Renegotiation Indication Extension," Request for Comments: 5746, Standards Track, Feb. 2010, 16 pages.
McGrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.
Brown, M., and R. Housley, "Transport Layer Security (TLS) Authorization Extensions," Request for Comments: 5878, Experimental, May 2010, 19 pages.
Kato, A., et al., "Camellia Cipher Suites for TLS," Request for Comments: 5932, Standards Track, Jun. 2010, 7 pages.
Eastlake, E., "Transport Layer Security (TLS) Extensions: Extension Definitions," Request for Comments: 6066, Standards Track, Jan. 2011, 25 pages.
Tuexen, M., et al., "Datagram Transport Layer Security (DTLS) for Stream Control Transmission Protocol (SCTP)," Request for Comments: 6083, Standards Track, Jan. 2011, 10 pages.
Mavrogiannopoulos, N., and D. Gillmor, "Using OpenPGP Keys for Transport Layer Security (TLS) Authentication," Request for Comments: 6091, Informational, Feb. 2011, 9 pages.
Turner, S., and T. Polk, "Prohibiting Secure Sockets Layer (SSL) Version 2.0," Request for Comments: 6176, Standards Track, Mar. 2011, 4 pages.
Igoe, K., and D. Stebila, "X.509v3 Certificates for Secure Shell Authentication," Request for Comments: 6187, Standards Track, Mar. 2011, 17 pages.
Kim, W., et al., "Addition of the ARIA Cipher Suites to Transport Layer Security (TLS)," Request for Comments: 6209, Informational, Apr. 2011, 10 pages.
Igoe, K., "Suite B Cryptographic Suites for Secure Shell (SSH)," Request for Comments: 6239, Informational, May 2011, 15 pages.
Rescorla, E., and N. Modadugu, "Datagram Transport Layer Security Version 1.2," Request for Comments: 6347, Standards Track, Jan. 2012, 33 pages.
Kanno, S., and M. Kanda, "Addition of the Camellia Cipher Suites to Transport Layer Security (TLS)," Request for Comments: 6367, Informational, Sep. 2011, 9 pages.
Salter, M., and R. Housley, "Suite B Profile for Transport Layer Security (TLS)," Request for Comments: 6460, Informational, Jan. 2012, 15 pages.
Sury, O., "Use of the SHA-256 Algorithm With RSA, Digital Signature Algorithm (DSA), and Elliptic Curve DSA (ECDSA) in SSHFP Resource Records," Request for Comments: 6594, Standards Track, Apr. 2012, 9 pages.
McGrew, D., and D. Bailey, "AES-CCM Cipher Suites for Transport Layer Security (TLS)," Request for Comments: 6655, Standards Track, Jul. 2012, 8 pages.
Bider, D., and M. Baushke, "SHA-2 Data Integrity Verification for the Secure Shell (SSH) Transport Layer Protocol," Request for Comments: 6668, Standards Track, Jul. 2012, 6 pages.
Merkle, J., and M. Lochter, "Elliptic Curve Cryptography (ECC) Brainpool Curves for Transport Layer Security (TLS)," Request for Comments: 7027, Informational, Oct. 2013, 11 pages.
Gutmann, P., "Encrypt-then-MAC for Transport Layer Security (TLS) and Datagram Transport Layer Security (DTLS)," Request for Comments: 7366, Standards Track, Sep. 2014, 7 pages.
"X.509," Wikipedia, the Free encyclopedia, Sep. 1, 2015, <https://en.wikipedia.org/wiki/X.509> [retreived Sep. 16, 2015], 13 pages.
Atkinson, R., "Security Architecture for the Internet Protocol," Request for Comments: 1825, Standards Track, Aug. 1995, 23 pages.
Atkinson, R., "IP Authentication Header," Request for Comments: 1826, Standards Track, Aug. 1995, 14 pages.
Atkinson, R., "IP Encapsulating Security Payload (ESP)," Request for Comments: 1827, Standards Track, Aug. 1995, 13 pages.
Metzger, P., et al., "IP Authentication Using Keyed MD5," Request for Comments: 1828, Standards Track, Aug. 1995, 6 pages.
Karn, P., et al., "The ESP DES-CBC Transform," Request for Comments: 1829, Standards Track, Aug. 1995, 11 pages.
Dierks, T., et al., "The TLS Protocol Version 1.0," Request for Comments: 2246, Standards Track, Jan. 1999, 75 pages.
Kent, S., "Security Architecture for the Internet Protocol," Request for Comments: 2401, Standards Track, Nov. 1998, 62 pages.
Orman, H., "The OAKLEY Key Determination Protocol," Request for Comments: 2412, Informational, Nov. 1998, 56 pages.
Newman, C., "Using TLS with IMAP, POP3 and ACAP," Request for Comments: 2595, Standards Track, Jun. 1999, 16 pages.

(56) References Cited

OTHER PUBLICATIONS

Medvinsky, A., et al., "Addition of Kerberos Cipher Suites to Transport Layer Security (TLS)," Request for Comments: 2712, Standards Track, Oct. 1999, 7 pages.
Khare, R., et al., "Upgrading to TLS Within HTTP/1.1," Request for Comments: 2817, Standards Track, May 2000, 13 pages.
Rescorla, E., "HTTP Over TLS," Request for Comments: 2818, Informational, May 2000, 8 pages.
Hoffman, P., "SMTP Service Extension for Secure SMTP over Transport Layer Security," Request for Comments: 3207, Standards Track, Feb. 2002, 9 pages.
Chown, P., "Advanced Encryption Standard (AES) Ciphersuites for Transport Layer Security (TLS)," Request for Comments: 3268, Standards Track, Jun. 2002, 8 pages.
Polk, W., et al., "Algorithms and Identifiers for the Internet X.509 Public Key Infrastructure Certificate and Certificate Revocation List (CRL) Profile," Request for Comments: 3279, Standards Track, Apr. 2002, 26 pages.
Blake-Wilson, S., et al., "Transport Layer Security (TLS) Extensions," Request for Comments: 3546, Standards Track, Jun. 2003, 28 pages.
Hollenbeck, S., "Transport Layer Security Protocol Compression Methods," Request for Comments: 3749, Standards Track, May 2004, 8 pages.
Friend, R., "Transport Layer Security (TLS) Protocol Compression Using Lempel-Ziv-Stac (LZS)," Request for Comments: 3943, Informational, Nov. 2004, 13 pages.
Schaad, J., et al., "Additional Algorithms and Identifiers for RSA Cryptography for Use in the Internet X.509 Public Key Infrastructure Certificate and Certificate Revocation List (CRL) Profile," Request for Comments: 4055, Standards Track, Jun. 2005, 24 pages.
Moriai, S., et al., "Addition of Camellia Cipher Suites to Transport Layer Security (TLS)," Request for Comments: 4132, Standards Track, Jul. 2005, 8 pages.
Lee, H.J., et al., "Addition of SEED Cipher Suites to Transport Layer Security (TLS)," Request for Comments: 4162, Standards Track, Aug. 2005, 7 pages.
Ford-Hutchinson, P., "Securing FTP with TLS," Request for Comments: 4217, Standards Track, Oct. 2005, 29 pages.
Dolan, M., "International Standard Audiovisual Number (ISAN) URN Definition," Request for Comments: 4246, Informational, 6 pages.
Lehtinen, S., and C. Lonvick, "The Secure Shell (SSH) Protocol Assigned Numbers," Request for Comments: 4250, Standards Track, Jan. 2006, 19 pages.
Ylonen, T., and C. Lonvick, "The Secure Shell (SSH) Protocol Architecture," Request for Comments: 4251, Standards Track, Jan. 2006, 28 pages.
Ylonen, T., and C. Lonvick, "The Secure Shell (SSH) Authentication Protocol," Request for Comments: 4252, Standards Track, Jan. 2006, 16 pages.
Ylonen, T., and C. Lonvick, "The Secure Shell (SSH) Transport Layer Protocol," Request for Comments: 4253, Standards Track, Jan. 2006, 30 pages.
Ylonen, T., and C. Lonvick, "The Secure Shell (SSH) Connection Protocol," Request for Comments: 4254, Standards Track, Jan. 2006, 23 pages.
Schlyter, J., and W. Griffin, "Using DNS to Securely Publish Secure Shell (SSH) Key Fingerprints," Request for Comments: 4255, Standards Track, Jan. 2006, 9 pages.

Cusack, F., and M. Forssen, "Generic Message Exchange Authentication for the Secure Shell Protocol (SSH)," Request for Comments: 4256, Standards Track, Jan. 2006, 12 pages.
Eronen, P., and H. Tschofenig, "Pre-Shared Key Ciphersuites for Transport Layer Security (TLS)," Request for Comments: 4279, Standards Track, Dec. 2005, 16 pages.
Kent, S., and K. Seo, "Security Architecture for the Internet Protocol," Request for Comments: 4301, Standards Track, Dec. 2005, 102 pages.
Kent, S., "IP Encapsulating Security Payload (ESP)," Request for Comments: 4303, Standards Track, Dec. 2005, 45 pages.
Housley, R., "Using Advanced Encryption Standard (AES) CCM Mode With IPsec Encapsulating Security Payload (ESP)," Request for Comments: 4309, Standards Track, Dec. 2005, 14 pages.
Galbraith, J., and P. Remaker, "The Secure Shell (SSH) Session Channel Break Extension," Request for Comments: 4335, Standards Track, Jan. 2006, 6 pages.
Bellare, M., et al., "The Secure Shell (SSH) Transport Layer Encryption Modes," Request for Comments: 4344, Standards Track, Jan. 2006, 12 pages.
Harris, B., "Improved Arcfour Modes for the Secure Shell (SSH) Transport Layer Protocol," Request for Comments: 4345, Standards Track, Jan. 2006, 5 pages.
Rescorla, E., and N. Modadugu, "Datagram Transport Layer Security," Request for Comments: 4347, Standards Track, Apr. 2006, 26 pages.
Blake-Wilson, S., et al., "Transport Layer Security (TLS) Extensions," Request for Comments: 4366, Standards Track, Apr. 2006, 29 pages.
Friedl, M., et al., "Diffie-Hellman Group Exchange for the Secure Shell (SSH) Transport Layer Protocol," Request for Comments: 4419, Standards Track, Mar. 2006, 10 pages.
Harris, B., "RSA Key Exchange for the Secure Shell (SSH) Transport Layer Protocol," Request for Comments: 4432, Standards Track, Mar. 2006, 8 pages.
Hutzelman, J., et al., "Generic Security Service Application Program Interface (GSS-API) Authentication and Key Exchange for the Secure Shell (SSH) Protocol," Request for Comments: 4462, Standards Track, May 2006, 28 pages.
Leontiev, S., and D. Shefanovski, "Using the GOST R 34.10-94, GOST R 34.1- 2001, and GOST R 34.11-94 Algorithms With the Internet X.509 Public Key Infrastructure Certificate and CRL Profile," Request for Comments: 4491, Standards Track, 19 pages.
Blake-Wilson, S., et al., "Elliptic Curve Cryptography (ECC) Cipher Suites for Transport Layer Security (TLS)," Request for Comments: 4492, Informational, May 2006, 36 pages.
Santesson, S., "TLS Handshake Message for Supplemental Data," Request for Comments: 4680, Standards Track, Sep. 2006, 10 pages.
Santesson, S., et al., "TLS User Mapping Extension," Request for Comments: 4681, Standards Track, Oct. 2006, 11 pages.
Galbraith, J. and R. Thayer, "The Secure Shell (SSH) Public Key File Format," Request for Comments: 4716, Nov. 2006, 11 pages.
Blumenthal, U., and P. Goel, "Pre-Shared Key (PSK) Ciphersuites with NULL Encryption for Transport Layer Security (TLS)," Request for Comments: 4785, Standards Track, Jan. 2007, 6 pages.
Galbraith, J., et al., "Secure Shell Public Key Subsystem," Request for Comments: 4819, Standards Track, Mar. 2007, 18 pages.

\* cited by examiner

COUNTERSIGNED CERTIFICATES

BACKGROUND

The security of network communications is important to both network users and network service providers. One way that the security of network communications is enhanced is through the use of digital certificates. A digital certificate is an electronic document that can be used to prove the identity of the certificate owner by showing ownership of a public key. Digital certificates can be signed (i.e., digitally signed) by the certificate owner or by a trusted third-party called a certificate authority ("CA"). The CA verifies the identity of a party and issues a certificate signed with a private key controlled by the CA. Maintaining the security of digital certificates can be difficult and consume significant resources. For example, certificate authorities use robust verification processes to ensure that certificates are not issued in error. An attacker may attempt to obtain a counterfeit digital certificate and impersonate another company, user, or entity. Owners of digital certificates take precautions to ensure that the private keys associated with their digital certificates are not compromised. As a precaution, digital certificates are occasionally updated to improve their effectiveness and mitigate newly discovered vulnerabilities.

Digital certificates can be used in combination with secure transport protocols such as Secure Socket Layer ("SSL") or Transport Layer Security ("TLS"). In TLS, an encrypted communication session is created between a client and a server. The client and the server can exchange digital certificates when negotiating the encrypted communication session in order to prove their identities. A part of a TLS handshake, a cipher suite is negotiated between the client and the server. A cipher suite is a named combination of authentication, encryption, Method Authentication Code ("MAC"), and key-exchange algorithms that are used to implement the secure connection between the client and server. In determining a cipher suite to use, the client and the server generally attempt to identify the most secure cipher suite that is supported by both the client and the server, based at least in part on a preference ordering. A determined attacker can generate an attack that can cause the client and the server to downgrade the mutually agreed-upon cipher suite to use a weakened form of encryption. The weakened form of encryption can be broken by the attacker, revealing sensitive data included in the encrypted communications. Although new cipher suites are developed and deployed in response to advancements in cryptographic technologies and newly discovered vulnerabilities, "forced downgrade" attacks are a continuing problem whose effective prevention requires significant resources.

BRIEF DESCRIPTION OF THE DRAWINGS

Various embodiments in accordance with the present disclosure will be described with reference to the drawings, in which.

DETAILED DESCRIPTION

Figure 1:
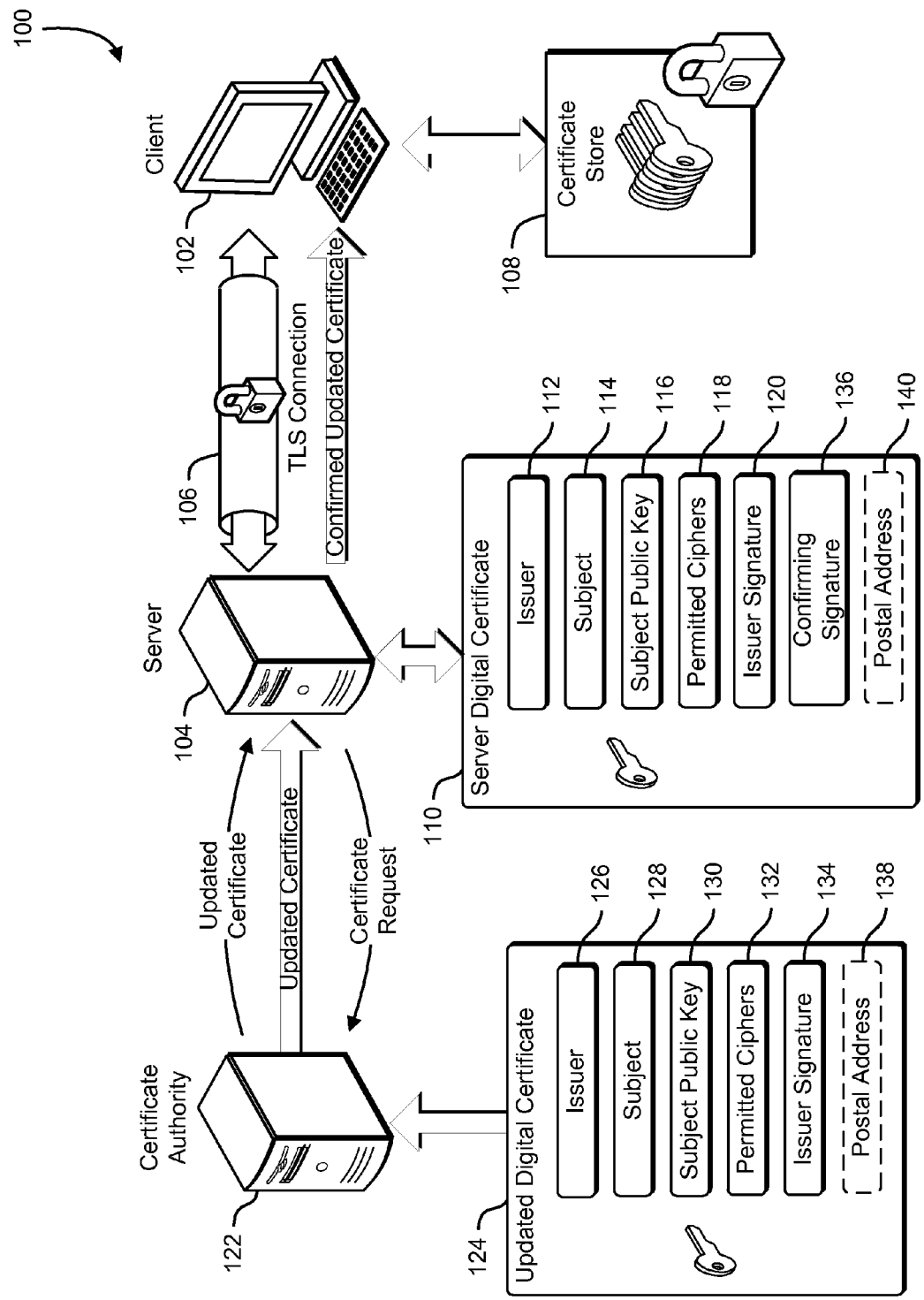
FIG. 1 shows an illustrative example of an environment in which various embodiments may be practiced.

The current document describes various systems and methods that provide secure digital communications over a computer network using digital certificates, secure transport protocols, or a combination of digital certificates and secure transport protocols. Secure transport protocols such as TLS can use digital certificates to verify the identity of network clients. For example, as a result of a client establishing a TLS connection to a server, the server provides the client with a digital certificate that includes identifying information. The digital certificate is cryptographically signed by the server, and also by a certificate authority. The certificate authority is a trusted third-party entity that verifies the identity of the server before signing the certificate. As a result of verifying both signatures, the client is reasonably assured that both the server and the certificate authority believe that the identifying information in the certificate is correct. To facilitate this arrangement, the client maintains a list of trusted certificate authorities. Establishing and maintaining, in a secure manner, a correct set of trusted certificate authorities can be difficult.

The addition of a confirming signature to a digital certificate provides a way for a client to safely update an original certificate by creating a continuity of trust between the original certificate and an updated certificate. When the owner of the digital certificate updates their original certificate to an updated certificate, the owner signs the updated certificate with the private key of the updated certificate. In addition, the owner adds a confirming signature to the updated certificate by signing the updated certificate with the private key of the original certificate. If the updated certificate, with the confirming signature, is provided to the client, the client confirms that the original certificate has not been revoked. If the original certificate has not been revoked, and is trusted by the client, the client can validate the updated certificate by in part verifying the confirming signature with the public key of the original certificate already possessed by the client. Additional verification steps may be performed on the updated certificate based at least in part on the signatures and content of the updated certificate. If the original certificate has been revoked, the original certificate is not trusted and the original certificate is not used to establish the trust on the updated certificate. If the original certificate is not trusted, the receiver may use other methods of validating the updated certificate such as using out of band channels, or using other methods described in this document.

For example, postal mail may be used as an out-of-band channel for providing a digital certificate. The identity of a client that is requesting a digital certificate from a certificate authority can be confirmed by embedding a postal address of the client into the digital certificate to be signed by the certificate authority. When the certificate authority fulfills the request, the certificate authority provides the requested certificate to the client by mailing the signed certificate to the postal address provided in the digital certificate. The requested certificate may be provided on various forms of physical computer readable media such as flash memory, SD cards, USB memory sticks, CD-ROMs, floppy disks, magnetic stripe media, barcodes, or two-dimensional barcodes. When the digital certificate containing the physical address information is validated by a client, the client can verify the address provided in the digital certificate with publicly available information regarding the physical address of the certificate's owner.

Digital Certificates can be rotated using a separate certificate-upgrade digital certificate that is reserved for this purpose. The certificate-upgrade digital certificate is stored in a secure location such as off-line storage, a hardware security module ("HSM"), or other isolated storage. When existing digital certificates are rotated, the certificate-upgrade digital certificate is retrieved from the secure location and used to retrieve updated certificates from a certificate authority which recognizes the certificate-upgrade digital certificate. After the updated certificates are retrieved, the certificate-upgrade digital certificate is returned to secure storage and removed from memory. The certificate-upgrade digital certificate is not used this to establish other TLS connections or to sign other documents. These functions are performed using a separate digital certificate. By limiting the use of the certificate-upgrade digital certificate, the private key of the certificate-upgrade digital certificate is not frequently loaded into memory, and may be less vulnerable to attack.

Digital certificates can be extended to include signatures of more than one CA. In one example, a certificate extension field includes a list of certificate authority signatures as well as various properties of each certificate authority. A client that is presented with a digital certificate signed by more than one CA may require a combination of valid CA signatures to trust the digital certificate. For example, the client may require three valid signatures in order to trust the digital certificate. In another example, the client may require certificate authorities from at least two geographic regions. In yet another example, the client may require certificate authorities from at least two distinct legal jurisdictions. In yet another example, the client may determine a level of trust for each signing certificate authority, and add the determined levels of trust to create an aggregate level of trust for the provided digital certificate. If the aggregate level of trust meets or exceeds a threshold value, the digital certificate is trusted. The properties (such as jurisdiction, geography, and trust level) associated with each signing certificate authority can be included in the extension with the signature.

Digital certificates can be used to enhance the security of secure transport protocols such as TLS. When a TLS connection is established between a client and a server, the client and server can exchange digital certificates to verify their identities. As part of establishing a TLS connection, the client and server negotiate a cipher suite for use during the secure session. In TLS, a cipher suite is a named combination of authentication, encryption, message authentication code ("MAC"), and key exchange algorithms. A number of cipher suites exist for use with a TLS connection, and new cipher suites are developed in response to advances in encryption technology, and newly discovered vulnerabilities. When a client and server establish a TLS connection, the client and server negotiate a cipher suite for use during the TLS session. In general, the client and server attempt to use the most secure protocol known to both the client and the server. However, one form of attack attempts to force a client and server to use a less-secure cipher suite, and then breaches the encryption of the less-secure connection. This attack strategy is sometimes called a "forced downgrade" attack.

The "forced downgrade" attack can be mitigated by identifying a minimum cipher strength and TLS protocol version in an extension field of the X.509 digital certificate of the client and the server. When the client and the server exchange digital certificates during the establishment of a TLS connection, the certificate extension identifies a minimum acceptable cipher strength and TLS protocol version for use with the certificate owner. This allows the client and the server to detect a downgrade attack which forces the TLS connection to use a vulnerable cryptographic configuration that could compromise the confidentiality or integrity of the communication session. For example, if server's certificate contains a minimum acceptable protocol version of "TLSv1.2," a client can detect a potential downgrade attack that attempts to force a fallback to SSLv2.0.

Another way that forced downgrade attacks can be mitigated, is by providing a cipher-suite pinning mechanism in the TLS implementation. Cipher-suite pinning can be implemented in a number of ways. In one implementation, as part of establishing a TLS session, a client and a server negotiate a cipher suite, the client and/or the server record the identity of the negotiated cipher suite. If the client and the server establish another TLS session in the future, both the client and the server can be configured to accept only cipher suites that are stronger than the previously negotiated cipher suite. In some implementations, the client or the server may permit connections using older cipher suites for a limited time. For example, when the client and the server negotiate a more secure cipher suite, future connections will be permitted with either the new cipher suite, or the previous cipher suite for a limited period of time.

To allow comparison of cipher-suites strengths, a strength score can be associated with each cipher suite. For example, a client may support the following cipher-suites with the scores shown:

TLS_ECDHE_RSA_WITH_AES_256_CBC_SHA=> strength of 3
TLS_RSA_WITH_AES_256_GCM_SHA384=>strength of 2
TLS_RSA_WITH_AES_256_CBC_SHA256=>strength of 1

If, on a first connection between a client and a server, the client and server negotiate a cipher suite of TLS_RSA_WITH_AES_256_GCM_SHA384 (with strength of 2), cipher suites used for later TLS connections would be limited to TLS_ECDHE_RSA_WITH_AES_256_CBC_SHA (strength of 3) or TLS_RSA_WITH_AES_256_GCM_SHA384 (with strength of 2). If either the client or the server attempts to use a cipher suite of TLS_RSA_WITH_AES_256_CBC_SHA256 (with strength of 1) for a future TLS connection, either or both of the client and the server can determine that TLS_RSA_WITH_AES_256_CBC_SHA256 is weaker than the previously accepted cipher suite of TLS_RSA_WITH_AES_256_GCM_SHA384 (with strength of 2), and can drop the connection or raise an investigative alarm.

FIG. 1 shows an illustrative example of an environment in which various embodiments may be practiced. A system 100 includes a client 102 and a server 104. The client 102 and the server 104 communicate with each other over a TLS connection 106. In establishing the TLS connection 106, the client 102 and the server 104 negotiate a particular cipher suite for use with the TLS connection. The client 102 and/or the server 104 determine a minimum cipher-suite strength based at least in part on previously negotiated cipher suites used for TLS connections between the client 102 and the server 104. If either the client 102 or the server 104 determines that the negotiated cipher suite is weaker than the minimum cipher-suite strength, either the client 102 or the server 104 can terminate the TLS connection 106 or raise an investigative alarm.

A server digital certificate 110 that is owned by the server 104 includes an issuer field 112, a subject field 114, a subject public key field 116, a list of permitted ciphers 118, and an issuer signature 120. The issuer field 112 contains information that identifies the certificate authority 122, which issued the server digital certificate 110. The subject field 114 holds information that identifies the server 104. The server 104 maintains a public-private key pair. The public key of the public-private key pair is stored in the subject public key field 116. The list of permitted ciphers 118 identifies a set of permitted ciphers that the server 104 will permit to be used in a TLS connection with the server 104. The issuer signature 120 is a cryptographic signature created using a private key of a public-private key pair owned by the issuing certificate authority specified in the issuer field 112.

The certificate authority 122 provides identity verification services by signing digital certificates using a private key known only by the certificate authority 122 after verifying the identity of the entity specified in the subject field 114. By verifying the signature of the certificate authority 122 using a public key corresponding to the certificate authority's private key, a recipient of a properly-signed digital certificate can be reasonably certain, based at least in part on the level of trust conferred to the certificate authority 122 by the client 102 that the digital certificate belongs to the entity identified in the subject field 114.

A digital certificate can be signed by more than one certificate authority, and the recipient of a digital certificate can validate the digital certificate by validating a combination of digital signatures. For example, a countersigned digital certificate is signed by two or more certificate authorities. The countersigned digital certificate includes an issuer signature, and one or more counter signatures. The issuer and each countersigning entity (signing entities), can have a physical location, a legal jurisdiction, and a level of trust granted by the client 102. The client validates the signature of each signing entity using the public key of each signing entity. The certificate may be accepted as valid based at least in part on the combined properties of the signing entities. In one example, the client 102 accepts the certificate if two or more trusted signing entities have validly signed the digital certificate. In another example, the client 102 accepts the certificate if signing entities from two different geographical regions have validly signed the digital certificate. In yet another example the client 102 accepts certificate if signing entities from two different legal jurisdictions have validly signed the digital certificate. The client 102 can synthesize a level of trust in many different ways based at least in part upon the number and diversity of signing entities, and require a particular threshold level of trust in order to accept the certificate. Through the use of multiple signing entities, the consequences associated with any particular signing entity being compromised by an attacker may be reduced.

The susceptibility of the client 102 and the server 104 to "forced downgrade" attacks during the negotiation of the TLS connection 106 may be reduced by utilizing the list of permitted ciphers 118. For example, when the client 102 initiates the TLS connection 106 to the server 104, the client 102 identifies a client-supported set of cipher suites in a TLS handshake message (Client Hello). The server 104 responds with a Server Hello message that includes the server's digital certificate and a chosen cipher suite. The server's digital certificate includes the list of permitted ciphers 118, and the client 102 can guard against "forced downgrade" attacks by confirming that the chosen cipher suite negotiated as part of the TLS handshake is included in the list of permitted ciphers 118. If an attacker attempts to force the client 102 and the server 104 to use a cipher suite that is not specified in the server digital certificate 110, the client 102 can terminate the TLS connection 106, renegotiate the cipher suite with the server 104, alert a system administrator of the attack, or take other corrective action. In another example, as a result of the client 102 requesting a TLS connection, the server 104 can request the digital certificate of the client 102. The digital certificate of the client 102 can include a list of permitted ciphers. If a cipher suite negotiated between the server 104 and the client 102 is not present in the list of permitted ciphers in the client's digital certificate, the server 104 can terminate the TLS connection or take other corrective action.

The system 100 can include a certificate store 108 that is accessible to the client 102. The certificate store 108 retains a collection of pinned digital certificates. The collection of pinned digital certificates maintained within the certificate store 108 is established using a process of certificate pinning. In one form of certificate pinning, digital certificates are loaded into the certificate store 108 using an out-of-band channel. For example, a set of digital certificates can be loaded into an application program such as a web browser when the application program is compiled or installed. In another example, the set of digital certificates is installed into the certificate store 108 by a system administrator when the server 104 is deployed into the system 100. In yet another example, a set of digital certificates is downloaded from a trusted certificate server and installed into the certificate store 108 by a system administrator. In another form of certificate pinning, digital certificates are loaded into the certificate store 108 when the client 102 first encounters a digital certificate for a particular subject. Once a certificate for a particular subject has been stored in the certificate store 108, future attempts at updating a certificate for the particular subject will be refused unless additional confirmation is provided. In many systems, certificate pinning is used to help secure the set of digital certificates on the certificate store 108 from attack. However, conventional certificate pinning can make it more difficult for the client 102 to update the set of digital certificates if certain certificates expire or are compromised by an attacker.

One way that a pinned digital certificate, such as the server digital certificate 110, can be updated is by adding a confirming signature to the server digital certificate 110. In one example, the server 104 sends a request to a certificate authority 122, requesting an updated digital certificate 124 to replace an outdated digital certificate in the certificate store 108. In response to the request, the certificate authority 122 provides the updated digital certificate 124 to the server 104. The updated digital certificate 124 includes an issuer field 126, a subject field 128, a subject public key field 130, a list of permitted ciphers 132, and an issuer signature 134. The updated digital certificate 124 is provided to the server 104 and replaces the server digital certificate 110. The server 104 adds a confirming signature 136 that is generated using the private key of the outdated digital certificate. The confirmed updated digital certificate is sent by the server 140 to the client 102. The client 102 confirms the issuer signature 120 using the public key of the certificate authority 122, and confirms the confirming signature 136 using the public key of the original digital certificate known by the client 102. In this way, the client 102 establishes a continuity of trust between the outdated digital certificate and the updated digital certificate 124.

In some examples, the updated digital certificate 124 includes a postal address 138. The postal address 138 can be used by the certificate authority 122 as an alternate distribution channel for the updated digital certificate 124. In one example, the server 104 requests a digital certificate and provides physical address information to the certificate authority 122. The certificate authority uses the provided physical address information to verify the identity of the server 104. In addition, the physical address information is uses as a means to distribute the requested digital certificate to the server 104. The physical address information can be confirmed against publicly accessible address information for the requesting server 104. If the certificate authority 122 determines to issue the updated digital certificate 124 to the server 104, the updated digital certificate 124 is written to physical computer-readable storage media such as flash memory, optical memory, SD cards, barcodes, QR codes, magnetic media, magnetic-stripe media, magnetic tape, battery-backed RAM, or other non-volatile computer-readable storage media. The physical computer-readable storage media is physically delivered to the server 104 at the specified physical address. Delivery may be achieved using a courier, messenger service, private parcel-delivery service, or national postal service. The server digital certificate that includes a postal address 140 is retained by the intended recipient. If an attacker requests a digital certificate using the identity of an innocent entity, either the request will be denied by the certificate authority 122 because the provided physical address information will be incorrect, or the updated digital certificate 124 will be delivered to the innocent entity rather than the attacker. If an innocent entity receives a digital certificate in the mail which was not requested, the innocent entity will be alerted to the potential attack on its digital identity.

In some examples, the server 104 maintains a secure certificate store that holds a key-rotation certificate. The key-rotation certificate is used when updating or rotating other digital certificates maintained by the server 104. When the server's other digital certificates are not being updated or rotated, the key-rotation certificate is returned to the secure certificate store, and is unloaded from the memory of the server 104. In this way, the private key that is associated with the key-rotation certificate may be less vulnerable to attack. The secure certificate store may be implemented as a portion of an existing certificate store on the server 104, or as a separate storage device connected to the server 104. In some examples, the separate certificate store is a removable storage device such as a USB drive, flash drive, SD card, optical disk, CD-ROM, or removable hard disk. When the server's other digital certificates are not being updated or rotated, the removable storage device is disconnected and stored in a secure location.

Figure 2:
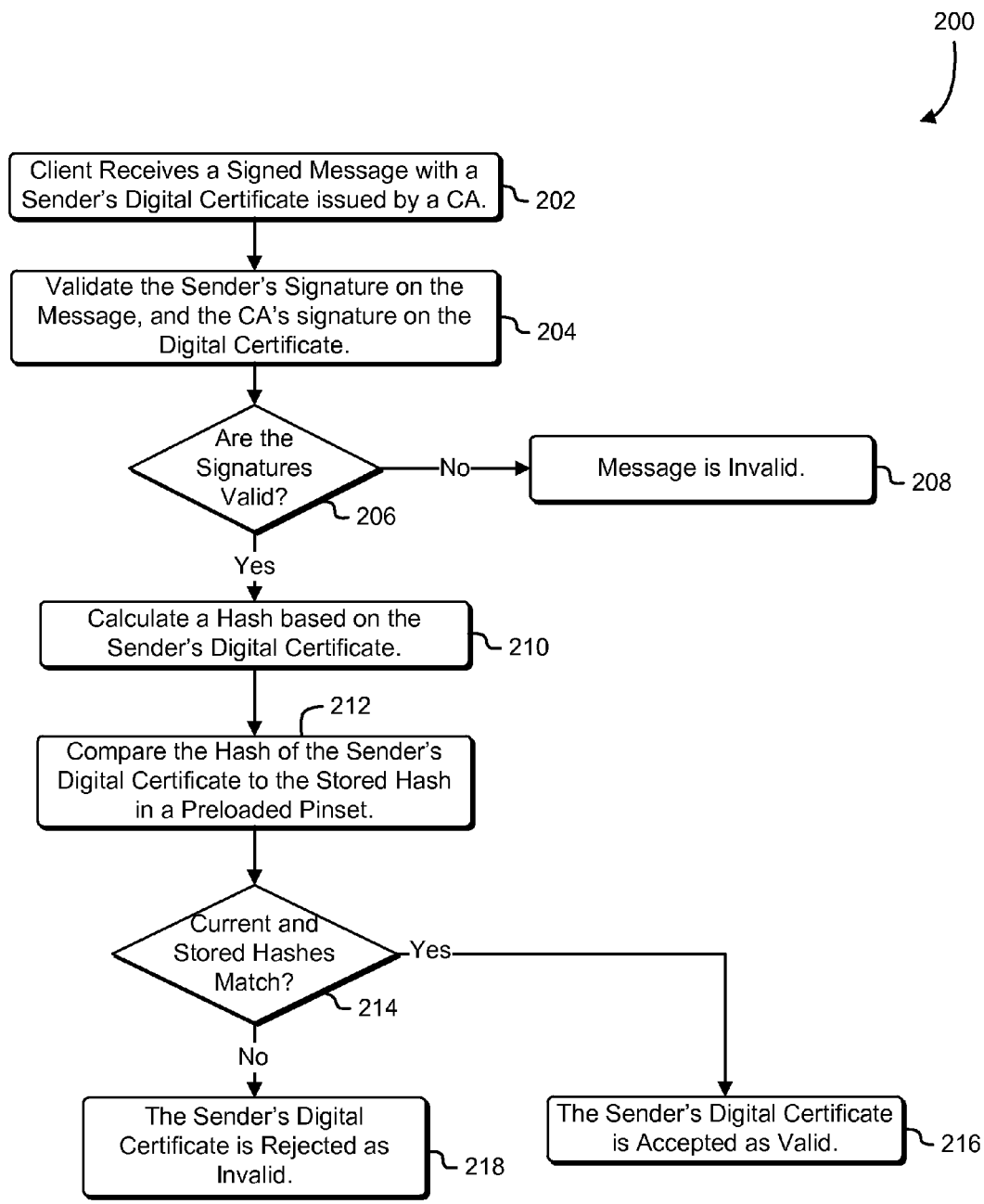
FIG. 2 shows an illustrative example of a process that, when performed by a client computer system, validates a certificate using hashes in a preloaded pin set, in accordance with an embodiment.

FIG. 2 shows an illustrative example of a process that, when performed by a client computer system, validates a certificate using hashes in a preloaded pin set, in accordance with an embodiment. The pin set is a set of stored hashes for trusted certificates that is loaded onto a client using an out-of-band channel. In some examples, the pin set is hardcoded in software that is loaded onto the client. In another example, the pin set is loaded onto the client as part of a software installation process. A process 200, when executed by the client, determines whether a certificate received by the client is represented in the pin set. At block 202, the client receives a signed message from a sender and a digital certificate associated with the sender. The client validates 204 the sender's signature on the message using the public key provided in the sender's digital certificate. The sender's digital certificate is validated by confirming the signature of the certificate authority using the certificate authority's public key. If the client determines 206 that either of the signatures is incorrect, the client declares that the message is invalid at block 208.

If the client determines 206 that the signatures are valid, execution proceeds to block 210 and the client calculates a hash based at least in part on the sender's digital certificate. In some examples, the hash is based at least in part on the public key of the sender's digital certificate. In other examples, the hash is based at least in part on the sender's digital certificate. At block 212, the client compares the calculated hash to the hashes in the pin set. If the calculated hash matches 214 a hash in the pin set, execution proceeds to block 216, and the client accepts the sender's certificate as valid. If the calculated hash is not contained in the pin set, the client rejects 218 the sender's certificate, and the message is rejected.

In some alternatives, the pin set contains the entire certificate and/or the entire public key of each certificate that is acceptable to the client. In such alternatives, the public keys or certificates in the pin set are compared to the public key or certificate of the sender.

Figure 3:
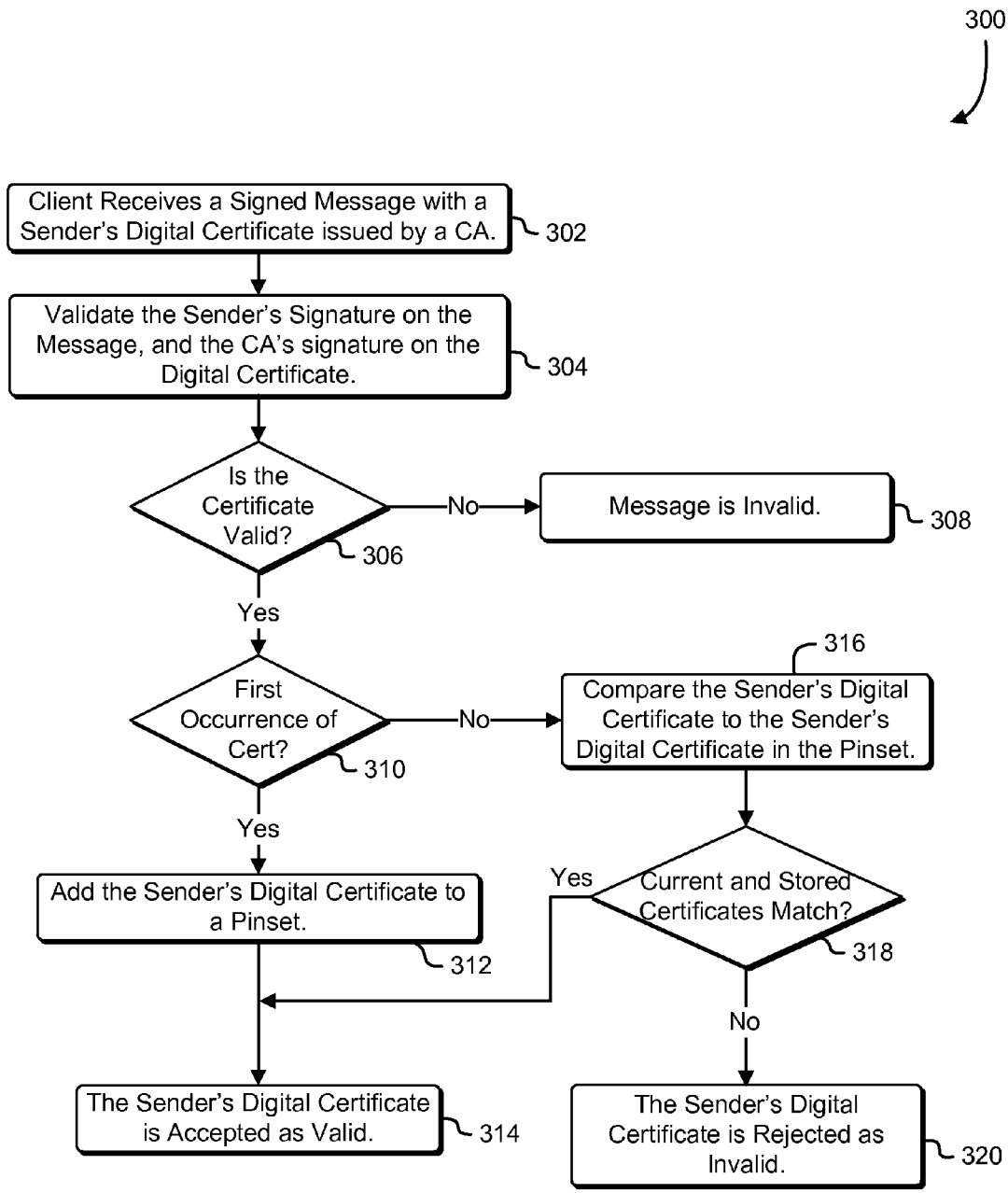
FIG. 3 shows an illustrative example of a process that, when performed by a client computer system, validates and pins a first-occurrence of a certificate, in accordance with an embodiment.

FIG. 3 shows an illustrative example of a process that, when performed by a client computer system, validates and pins a first-occurrence of a certificate, in accordance with an embodiment. The pin set is expanded as certificates for new entities are received by the client. A process 300, when executed by a client, adds the first certificate received for a particular sender to the pin set, and rejects later-received certificates for the particular sender. At block 302, the client receives a signed message from a sender, along with the sender's digital certificate issued by a CA. The client validates 304 the sender's signature on the message using the public key of the sender provided in the sender's digital certificate. The sender's digital certificate may be validated by validating the signature of the certificate authority on the sender's digital certificate using the public key of the certificate authority. If the client determines 306 that the sender's digital certificate or the message is not properly signed, execution proceeds to block 308 and the client indicates that the message is invalid.

If the client determines 306 that the message and the sender's digital certificate are properly signed, execution proceeds to block 310. At block 310, the client determines if the pin set includes a digital certificate for the sender. If the pin set does not include a digital certificate for the sender, execution proceeds to block 312. At block 312, the client adds the sender's digital certificate to the pin set, and the sender's digital certificate is accepted at block 314. If the pin set includes a digital certificate for the sender, execution proceeds to block 316. At block 316, the client compares the sender's digital certificate with the corresponding digital certificate included in the pin set. If the client determines 318 that the sender's digital certificate matches the corresponding certificate included in the pin set, execution proceeds to block 314 where the client accepts the sender's digital certificate. If the client determines 318 that the sender's digital certificate does not match the corresponding digital certificate included in the pin set, execution proceeds to block 320 and the client rejects the sender's digital certificate.

Figure 4:
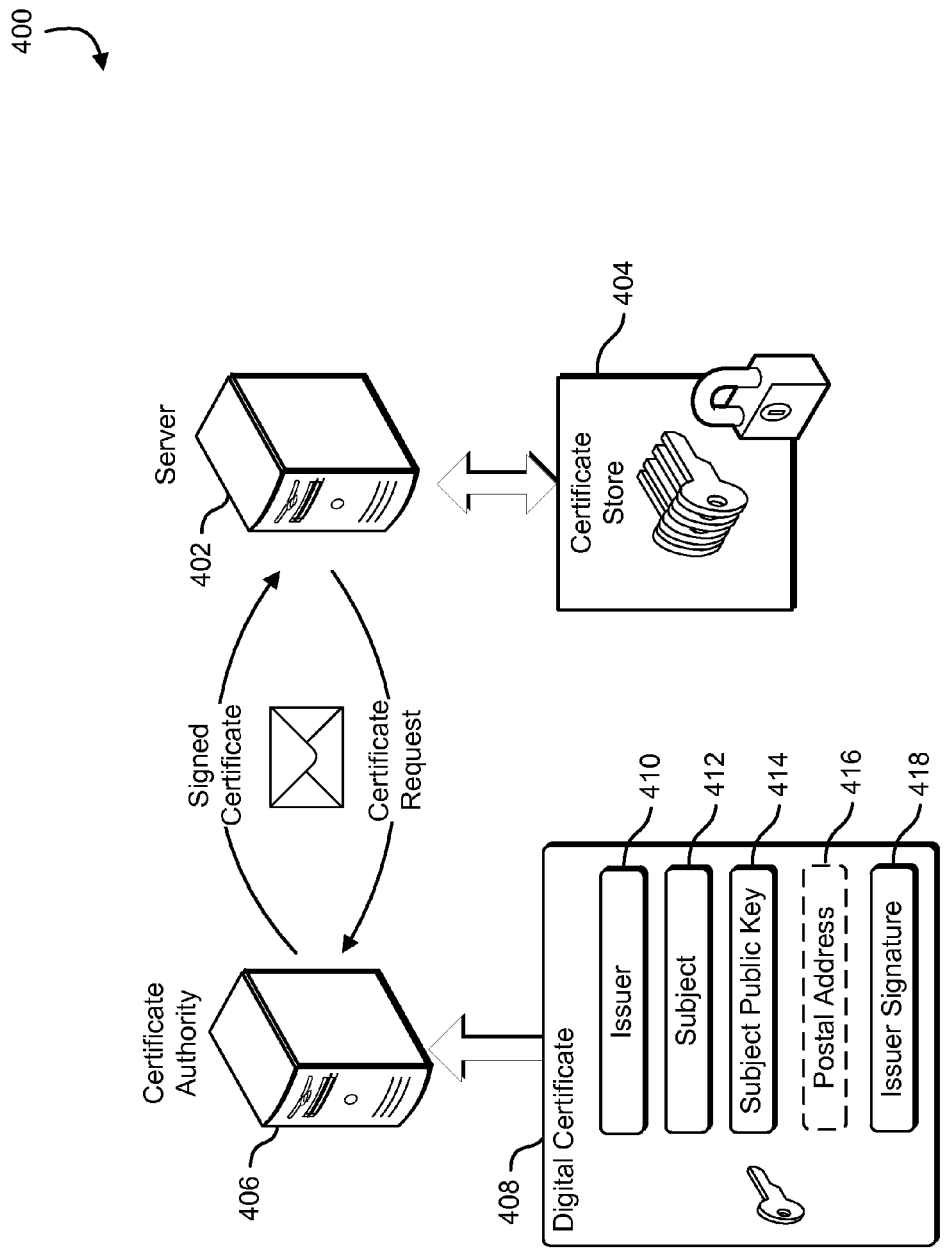
FIG. 4 shows an illustrative example of a system that issues digital certificates via the postal service, in accordance with an embodiment.

FIG. 4 shows an illustrative example of a system that issues digital certificates via the postal service, in accordance with an embodiment. A system 400 includes a server 402 that maintains a certificate store 404. The server 402 can be a computer system, an application running on the computer system, a computer server, a network service, service, or other entity that maintains a digital identity. In some examples, a service can be implemented using a plurality of physical and/or virtual computer systems that are coordinated using a load balancer. The plurality of physical and/or virtual computer systems can act as a single entity that is represented by a single digital certificate and digital identity. The certificate store 404 retains a collection of digital certificates. The certificate store may be implemented using a database on a hard disk, flash drive, flash memory, or other nonvolatile physical computer-readable storage media. The server 402 requests a digital certificate from a certificate authority 406 by in part providing an unsigned digital certificate that includes physical address information. The physical address information identifies the physical address associated with the server 402. For example, the physical address can be a mailing address for a company that manufactures the server 402. In another example, the physical address is an address for legal counsel of the company that provides the server 402. In yet another example, the physical address is an address where the server 402 is physically located.

As a result of receiving the request for a digital certificate from the server 402, the certificate authority 406 confirms the identity of the server 402. The certificate authority 406, as part of confirming the identity of the server 402, confirms the physical address information using publicly available databases or government registries. In one example, the certificate authority 406 confirms that the provided physical address information matches information in a state corporate registry.

If the certificate authority 406 determines that the information provided by the server 402 is correct, and determines to grant the request for a digital certificate, the certificate authority 406 generates a digital certificate 408. The digital certificate 408 includes information that identifies the certificate authority 406 in an issuer field 410, identifies the server 402 in a subject field 412, and provides a public key associated with the server 402 in a subject public key field 414. The physical address information is recorded in a postal-address extension 416. The digital certificate 408 is signed by the certificate authority 406 in an issuer signature field 418.

The postal-address extension 416 may be implemented as an X.509 extension to the digital certificate 408. For example, in an X.509 certificate, an extension includes an extension type, an extension value, and a critical flag. The extension type can be specified using a physical-address-information extension identifier, and the extension value can contain the physical address information. The physical address information may include one or more of a name, country, a county, a city, a street address, a ZIP Code, an apartment or suite number, a PO Box, geographic coordinates, latitude and longitude, GPS coordinates, or other geographic information. The critical flag indicates whether an X.509 certificate extension must be supported by the recipient. In the case of a postal-address extension 416, the critical flag may be either true or false depending on whether the physical address information will be utilized after the certificate is issued.

The certificate authority 406 uses the physical address information when issuing the digital certificate 408 to the server 402 by writing the digital certificate 408 to physical computer-readable media, and sending the physical computer-readable media to the location indicated by the physical address information. In one example, the computer-readable media containing the digital certificate 408 is sent to the server 402 using a national postal service. In another example, the computer-readable media containing the digital certificate 408 is sent to the server 402 using a private courier service. In yet another example, the computer-readable media containing the digital certificate 408 is sent to the server 402 using a private parcel service. In yet another example, a drone delivers the computer-readable media containing the digital certificate 408 to the physical location. The computer-readable media may be a USB flash drive, and SD card, a magnetic stripe, a barcode or QR code printed on sheet media, magnetic disk, and optical disk, battery-backed RAM, and RFID chip, or other tangible computer-readable storage media.

If an adversary attempts to impersonate the identity of an organization using social engineering, the adversary will find it difficult to receive the signed certificate from the certificate authority 406 by, for example, downloading the certificate from the CA's website. Incorrect physical address information provided by the adversary may be detected by the certificate authority 406. Correct physical address information provided by the adversary may result in the certificate being sent to the server 402 rather than the attacker. If an organization receives an unexpected signed certificate by physical delivery, the organization will be notified of the adversary's social engineering attack. By providing physical address information within the digital certificate 408, online customers of the organization are able to verify the address of certificates received (such as certificates received during a TLS handshake process) against the publicly-available address information for the organization. A change of address can be detected by the online customers, raising an alarm that requires a manual audit before trusting the digital certificate.

Figure 5:
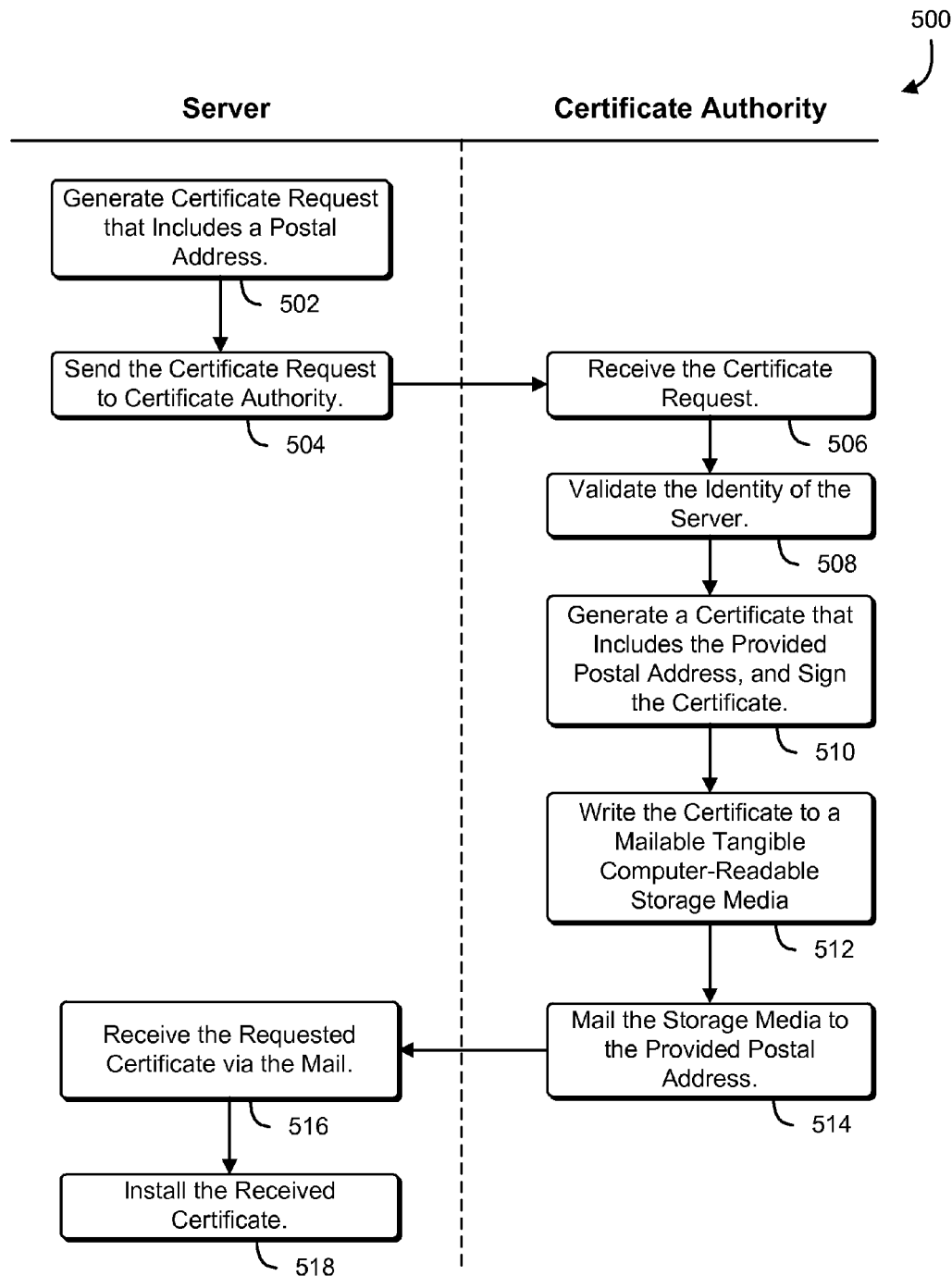
FIG. 5 shows an illustrative example of a process that, when performed by a client and a certificate authority, provides the client with a digital certificate via postal mail, in accordance with an embodiment.

FIG. 5 shows an illustrative example of a process that, when performed by a server and a certificate authority, provides the server with a digital certificate via postal mail, in accordance with an embodiment. A process diagram 500 illustrates a process that begins at block 502 with a server generating a certificate request that includes a postal address. The server can be a computer system, a computer application, a network service, or other entity that can assume a digital identity. In some examples, the postal address can be a name, city, street address, and ZIP Code where the server is physically located. In another example, the postal address designates a company address that is responsible for the server. At block 504, the server sends the certificate request, including the postal address, to the certificate authority. In some examples, the certificate request is sent electronically to the certificate authority over a computer network. In other examples, the certificate request is sent via a voice phone call, or in the form of a written letter, or on removable computer-readable media sent through the mail.

The certificate authority receives the certificate request from the server at block 506. At block 508, the certificate authority validates the identity of the server by in part confirming that the postal address provided by the server matches other information provided in the certificate request such as the server name. In some implementations, the postal information is confirmed against publicly available information such as state Corporation registries, telephone registries, legal contact information, and government databases. If the certificate authority determines that the certificate request is valid, the request is granted and execution proceeds to block 510. At block 510, the certificate authority generates a certificate for the server that includes the provided postal address, and the certificate authority signs the generated certificate using the private key of the certificate authority. The signed certificate is written 512 to a removable, tangible, computer-readable storage media such as a barcode or QR code on sheet media, flash memory, a USB memory stick, an SD card, optical media, a CD-ROM, or battery backed RAM. At block 514, the certificate authority causes the computer-readable storage media to be removed from the computer system that implements the certificate authority, and shipped to the server using the postal address information provided by the server. In various examples, the computer-readable storage media is shipped using a national postal service, a private courier, a private parcel service, or an automated delivery vehicle such as a drone.

At block 516, the server receives the requested certificate on the computer-readable storage media from the certificate authority. If the server is an entity which did not request a digital certificate from the certificate authority, the server is notified of the unauthorized request by the receipt of the unsolicited digital certificate. If the server did request a digital certificate from the certificate authority, the server reads the digital certificate from the received computer-readable storage media, and verifies the signature of the certificate authority using the certificate authority's public key. At block 516, the server installs the received digital certificate.

Figure 6:
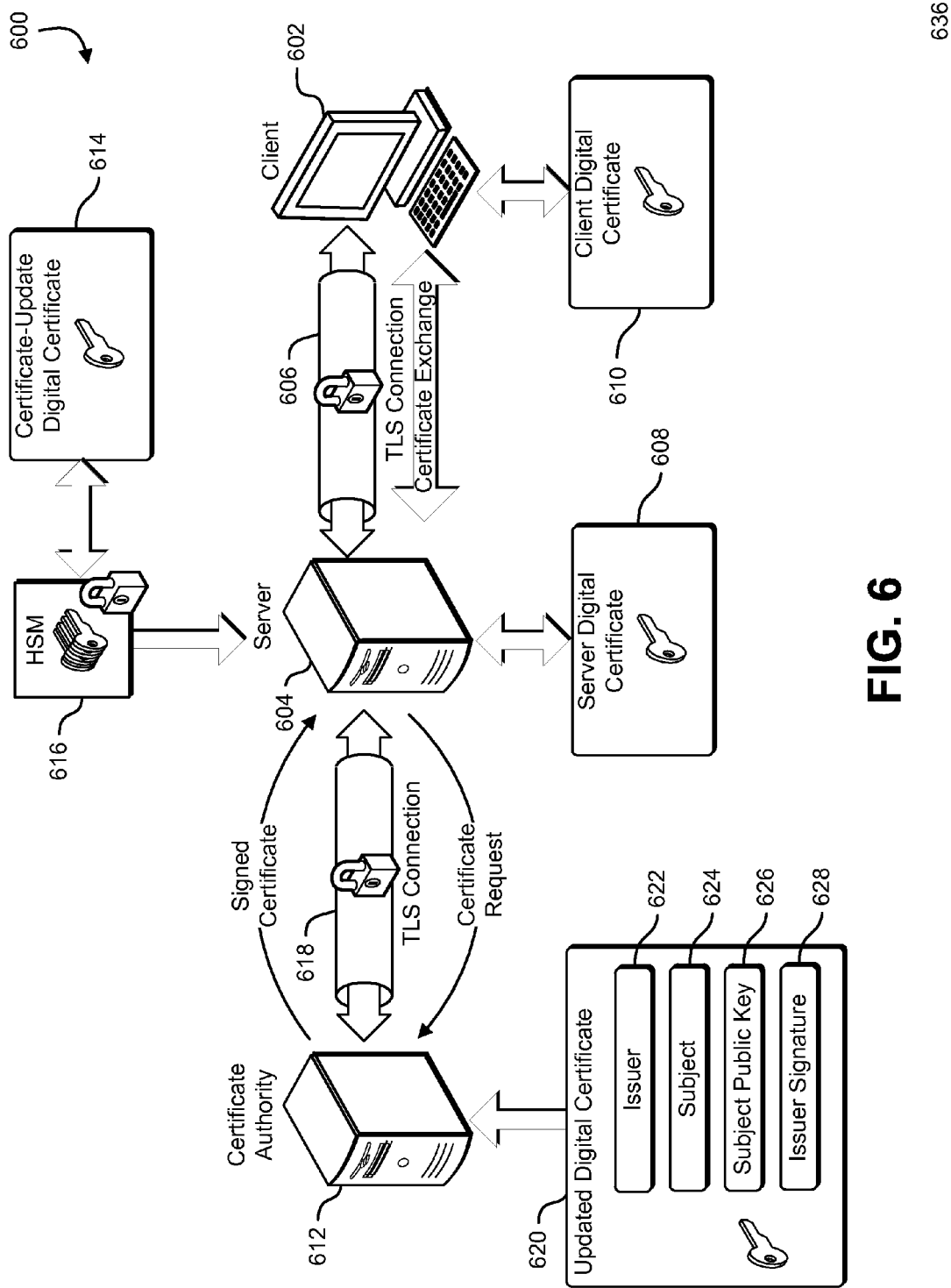
FIG. 6 shows an illustrative example of a system that updates digital certificates over an encrypted connection that is secured with a certificate-update certificate, in accordance with an embodiment.

FIG. 6 shows an illustrative example of a system that updates digital certificates over an encrypted connection that is secured with a certificate-update certificate, in accordance with an embodiment. A system 600 includes a client 602 and a server 604 that communicate over a TLS connection 606. The server 604 maintains a server digital certificate 608, and the client 602 maintains a client digital certificate 610. When the TLS connection 606 is initiated by the client 602, the server 604 provides the server digital certificate 608 to the client 602. In some examples, the server 604 requests a digital certificate from the client 602, and the client 602 provides the client digital certificate 610 to the server 604. The server digital certificate 608 and the client digital certificate 610 are issued by a certificate authority 612. The client 602 is able to confirm the identity of the server 604 by validating a digital signature of the server 604 and a digital signature of a certificate authority 612 on the server digital certificate 608. The server 604 is able to confirm the identity of the client 602 by validating a digital signature of the client 602 and a digital signature of the certificate authority 612 on the client digital certificate 610.

If the server digital certificate 608 is updated, the server 604 accesses a certificate-update digital certificate 614 maintained in a secure storage location 616 such as a hardware security module ("HSM"). In some examples, secure storage location is an off-line storage device such as a removable USB drive, or a flash memory card. The off-line storage device is connected to the server 604 and made accessible as a result of the determination to update the server digital certificate 608. A certificate-update TLS connection 618 to the certificate authority 612 is initiated by the server 604. During a TLS handshake that establishes the certificate-update TLS connection 618, the certificate authority 612 requests a digital certificate from the server 604 and the server 604 provides the certificate-update digital certificate 614 to the certificate authority 612. The server 604 requests an updated digital certificate 620 from the certificate authority 612 in order to update the server digital certificate 608. The certificate authority 612 validates the digital certificate provided by the server 604, and based at least in part on the server providing the certificate-update digital certificate 614, the certificate authority 612 approves the request for an updated digital certificate to replace the server digital certificate 608.

The updated digital certificate 620 is generated that identifies the certificate authority 612 in an issuer field 622. Information identifying the server 604 is entered in a subject field 624. An updated public key for the server digital certificate is provided in a subject public key field 626. The certificate authority 612 generates a signature for the updated digital certificate 620 with the private key belonging to the certificate authority 612, and stores the signature in an issuer signature field 628. The updated digital certificate 620 is transmitted to the server 604 over the certificate-update TLS connection 618.

When the certificate-update digital certificate 614 is not in use, the certificate-update digital certificate 614 is erased from the memory of the server 604, and returned to the secure storage location 616. In many situations, an attacker that acquires access to the server 604 will be unable to access the certificate-update digital certificate 614 because the certificate-update digital certificate 614 will not be present within the memory of the server 604. If the server digital certificate 608 is compromised by an attacker, and revoked by the certificate authority 612, the server 604 may use the certificate-update digital certificate 614 to contact the certificate authority 612, revoke compromised digital certificates, and acquire updated replacement digital certificates.

Figure 7:
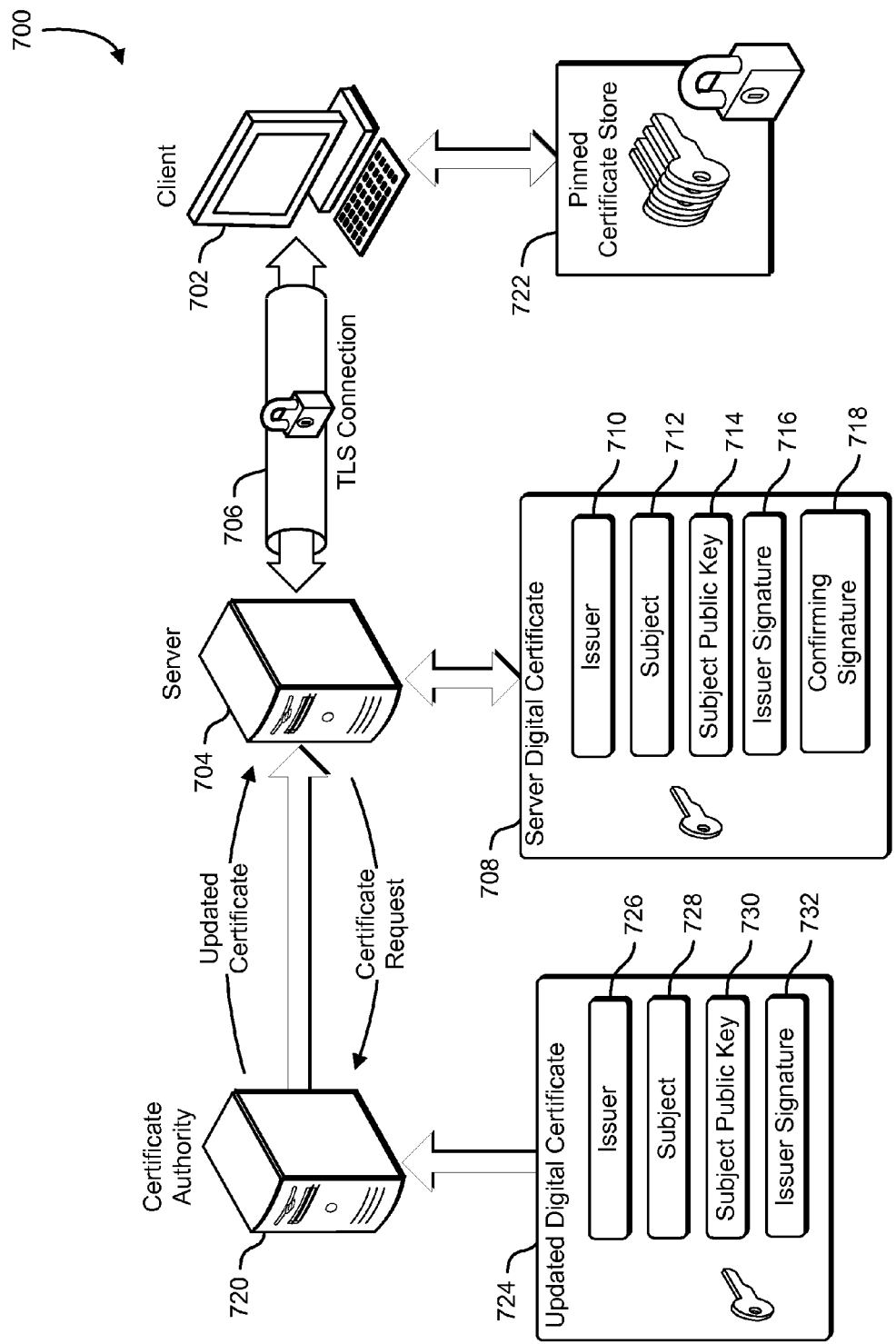
FIG. 7 shows an illustrative example of a system that provides a confirming signature with an updated digital certificate, in accordance with an embodiment.

FIG. 7 shows an illustrative example of a system that provides a confirming signature with an updated digital certificate, in accordance with an embodiment. A system 700 includes a client 702 and a server 704 that communicate over a TLS connection 706. The server 704 provides a server digital certificate 708 in a TLS handshake message to the client 702 as part of establishing the TLS connection 706. The server digital certificate 708 includes an issuer field 710, a subject field 712 subject public key field 714 an issuer signature field 716, and a confirming signature 718. The server digital certificate 708 is issued by a certificate authority 720 that is identified in the issuer field 710. The subject field 712 identifies the server 704. The subject public key field 714 contains a public key of a public-private key pair maintained by the server 704. The server digital certificate 708 is signed with a digital signature of the certificate authority 720 in the issuer signature field 716.

The client 702 maintains a pinned certificate store 722. The pinned certificate store 722 holds a collection of pinned certificates. The collection of pinned certificates can be established by preloading the collection of pinned certificates over an out-of-band channel as described above, or by using the process of first-occurrence pinning also described above. Updating particular certificates in the collection of pinned certificates can be facilitated by the server 704 by adding a confirming signature 718 to the server digital certificate 708. The confirming signature 718 is a digital signature created using a private key associated with a previous version of the server digital certificate in the possession of the client 702.

In one example, the client 702 requests an updated certificate from the server 704, and provides an original server digital certificate to the server 704. As a result of receiving the request for an updated certificate, the server 704 requests an updated certificate from the certificate authority 720. The certificate authority 720 generates an updated digital certificate 724. The updated digital certificate 724 includes an issuer field 726, a subject field 728, a subject public key field 730, and an issuer signature 732. The issuer field 726 identifies the certificate authority 720. The subject field 728 includes identifying information of the server 704. The subject public key field 730 holds a public key of a public-private key pair maintained by the server 704. The issuer signature 732 is a digital signature using a private key of the certificate authority 720. The updated digital certificate 724 is provided to the server 704 by the certificate authority 720. The updated digital certificate 724 updates the server digital certificate 708. The server 704 adds a confirming signature 718 in the server digital certificate 708. The confirming signature 718 is created by signing the updated server digital certificate 708 with the private key associated with the original server digital certificate. The updated server digital certificate is provided to the client 702.

In another example, the server 704 determines that the server digital certificate 708 needs to be updated. The server 704 requests an updated certificate from the certificate authority 720. The certificate authority 720 generates the updated digital certificate 724 as described above. The updated digital certificate 724 is provided by the certificate authority 720 to the server 704. The server 704 signs the updated digital certificate 724 with a confirming signature by signing the updated server digital certificate with the private key of the original server digital certificate. The updated server digital certificate with the confirming signature is provided to the client 702.

As a result of receiving an updated server digital certificate with a confirming signature, the client 702 confirms the confirming signature using the original server digital certificate within the pinned certificate store 722. The server digital signature on the updated server digital certificate is confirmed using the public key of the server 704, and the certificate authority (issuer) digital signature on the updated server digital certificate is confirmed using the public key of the certificate authority 720 by the client 702. If the server signature, the certificate authority signature, and the confirming signature are valid, the client 702 updates the server's certificate in the pinned certificate store 722 with the updated server digital certificate. In some examples, the client 702 confirms that the server's original certificate in the pinned certificate store 722 has not been revoked prior to updating the server's original certificate. The client 702 will not accept an updated server digital certificate that has a confirming signature created with the private key associated with a revoked certificate.

In some examples, the server causes the original digital certificate to be revoked as a result of providing the updated digital certificate to the client. In one implementation, the server revokes the original digital certificate by adding the original digital certificate to a certificate revocation list ("CRL"). In another implementation, the server revokes the original digital certificate by using the Online Certificate Status Protocol ("OCSP").

Figure 8:
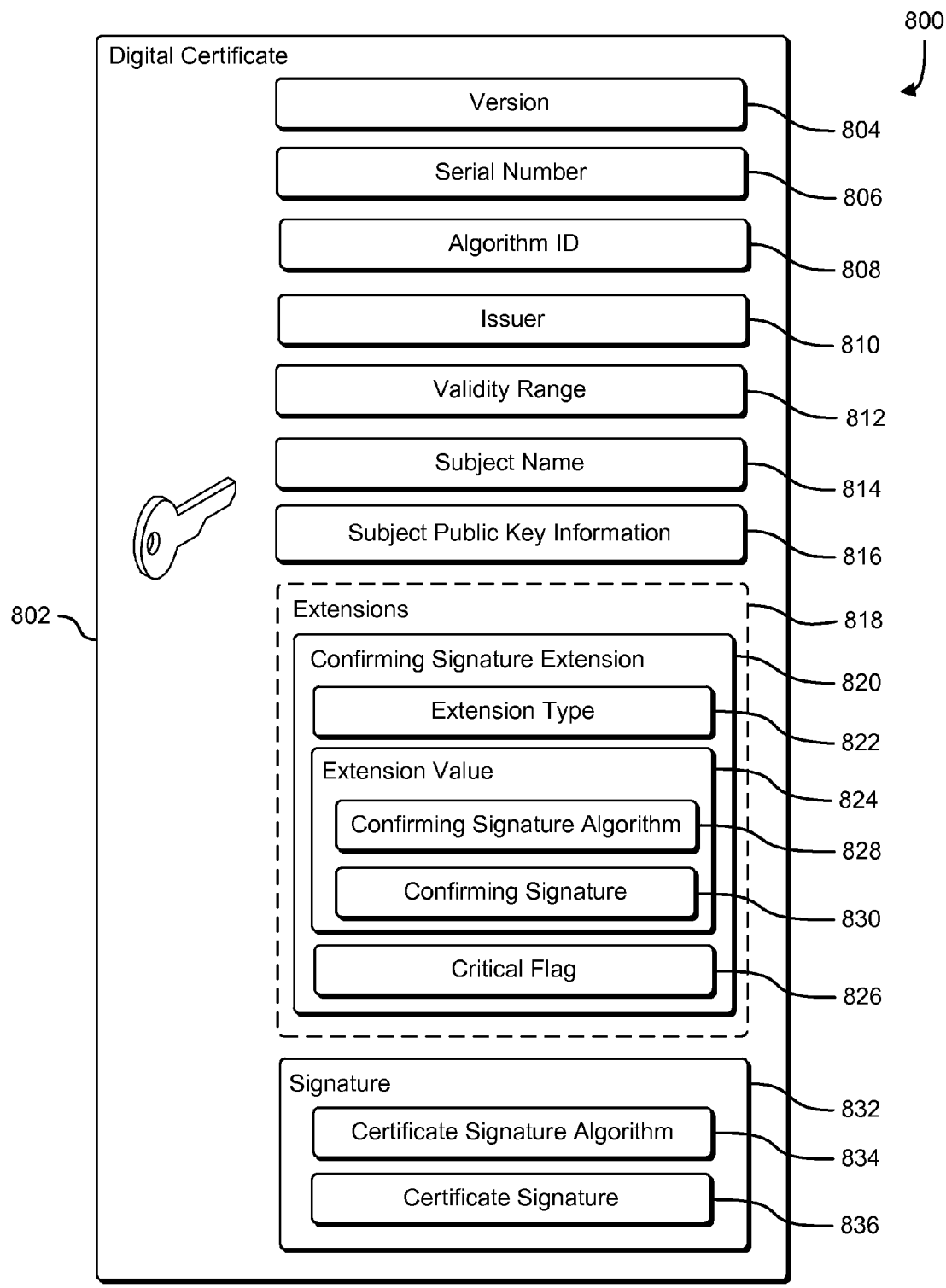
FIG. 8 shows an illustrative example of a digital certificate that includes a confirming signature as a certificate extension, in accordance with an embodiment.

FIG. 8 shows an illustrative example of a digital certificate that includes a confirming signature as a certificate extension, in accordance with an embodiment. A diagram 800 illustrates the structure of a digital certificate 802, such as an X.509 digital certificate. The structure of an X.509 digital certificate is described in RFC 5280 which is hereby incorporated by reference. The digital certificate 802 includes a version field 804, a serial number field 806, an algorithm ID field 808, an issuer field 810, a validity range 812, a subject name 814, and subject public key information 816. The version field 804 describes the version of the structure of the digital certificate 802. For example, for an X.509 certificate the version field 804 can specify a version of 3 when extensions are used with the digital certificate 802. The serial number field 806 holds an identifier assigned by and issuing certificate authority that is unique to each issued certificate. An algorithm ID field 808 contains an algorithm identifier that specifies an algorithm that is used by the certificate authority to sign the digital certificate 802. Various signature algorithms are specified in RFC 3279, RFC 4055, and RFC 4491, which are herein incorporated by reference, but other signature algorithms may also be specified. The issuer field 810 identifies the entity that has signed an issued the digital certificate 802. The validity range 812 specifies a range of time for which the digital certificate 802 is valid. In one example, the validity range 812 specifies a beginning time and date, and an expiration time and date. The subject name 814 identifies the entity associated with the public key identified in the subject public key information 816.

In various examples, the digital certificate 802 includes one or more optional extensions. In one example, a list of extensions 818 includes a confirming signature extension 820. The confirming signature extension includes an extension type 822, an extension value 824, and a critical flag 826. The extension type 822 contains an identifier that identifies the confirming signature extension 820 as a confirming-signature-type of extension. The critical flag 826 specifies whether the confirming signature extension 820 must be implemented by a recipient of the digital certificate 802. For the confirming signature extension 820, the critical flag 826 may be false if the owner of the digital certificate 802 does not require a recipient to confirm the authenticity of the digital certificate 802 with the information contained in the confirming signature extension 820. If the owner of the digital certificate 802 requires a recipient to confirm the authenticity of the digital certificate 802 using the information contained in the confirming signature extension 820, the critical flag 826 may be set to true. The extension value 824 includes a confirming signature algorithm 828 and a confirming signature 830. The confirming signature algorithm 828 identifies a signature algorithm used to generate the confirming signature 830. The confirming signature algorithm 828 may be an algorithm specified in specified in RFC 3279, RFC 4055, RFC 4491, or other cryptographic signature algorithm. The confirming signature 830 holds a digital signature generated using a key associated with a previous version of the digital certificate 802. For example, the confirming signature 830 may hold a confirming signature described above in FIG. 7.

The digital certificate 802 includes a signature 832. The signature 832 includes a certificate signature algorithm 834 and a certificate signature 836. The certificate signature algorithm 834 is an identifier that identifies an algorithm used to generate the certificate signature 836. The algorithm may be an algorithm specified in RFC 3279, RFC 4055, RFC 4491, or other cryptographic signature algorithm. The certificate signature 836 is generated by the entity identified by the subject name 814, using a private key associated with the subject public key information 816.

Figure 9:
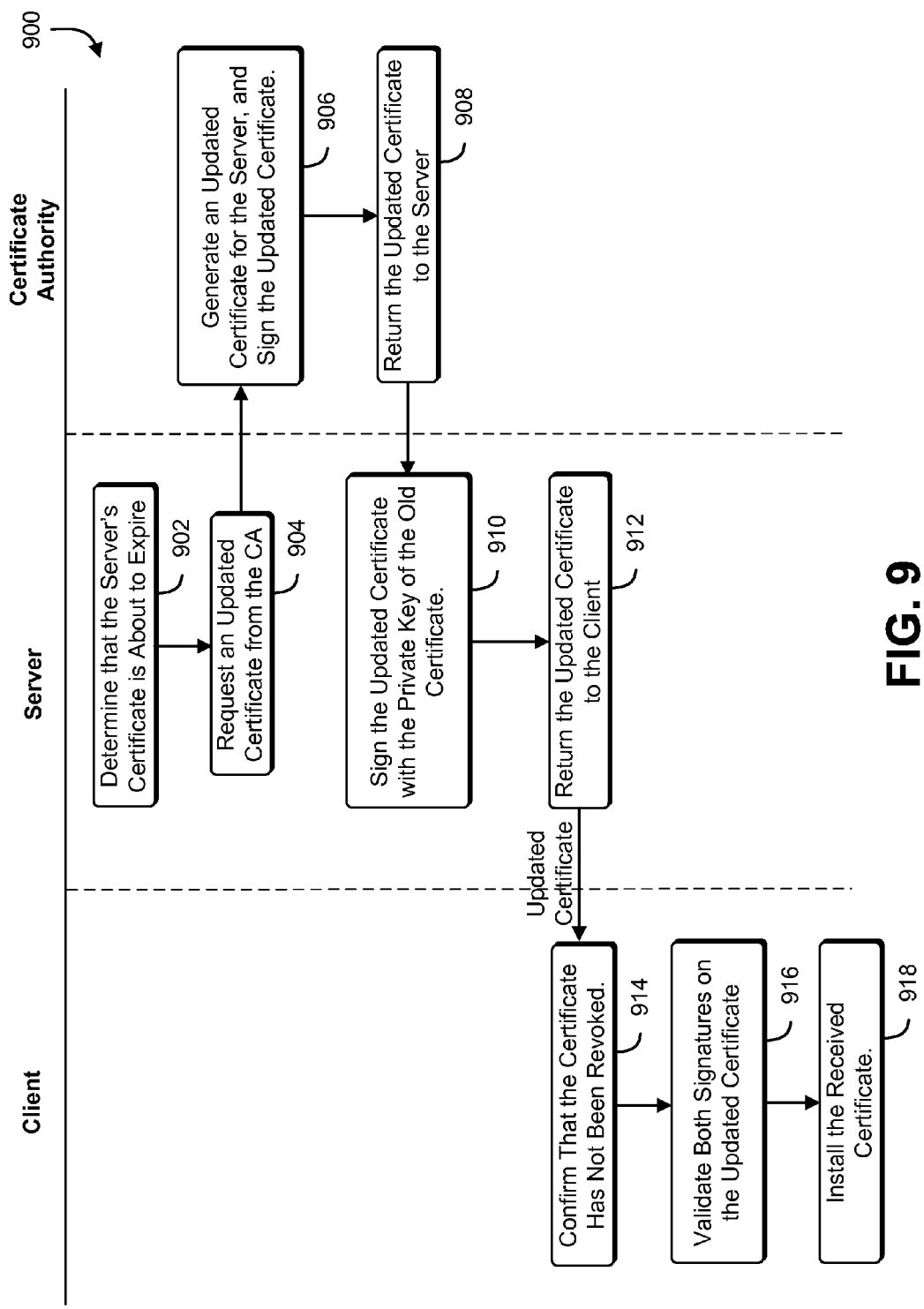
FIG. 9 shows an illustrative example of a process that, when performed by a client, a server, and a certificate authority, updates a digital certificate using a confirming signature, in accordance with an embodiment.

FIG. 9 shows an illustrative example of a process that, when performed by a client, a server, and a certificate authority, updates a digital certificate using a confirming signature, in accordance with an embodiment. A swim diagram 900 illustrates a process that begins at block 902 where the server determines that an existing digital certificate used by the client and owned by the server needs to be updated. For example, the old digital certificate may be nearly expired, out of date, or obsolete, and therefore the server may issue an updated certificate from the server. At block 904, the server requests an updated digital certificate from the certificate authority. The certificate authority receives the request for an updated certificate from the server, and generates 906 an updated certificate for the server. The certificate authority signs the updated certificate using a private key of a public-private key pair maintained by the certificate authority. At block 908, the certificate authority returns the signed updated certificate to the server.

The server receives the updated certificate and confirms the signature of the certificate authority. At block 910, the server signs the updated certificate using the private key associated with the old certificate. The updated certificate that includes the signature of the old certificate, is returned to the client at block 912. In some examples, the server provides a digital signature using the private key associated with the updated digital certificate to the client.

At block 914, the client receives the updated certificate from the server. The client examines the confirming signature of the updated certificate, and verifies that the certificate used to generate the confirming signature has not been revoked. The client validates 916 the signature of the certificate authority, the confirming signature that is generated using the old certificate, and if provided by the server, the signature of the server using the updated certificate. If the signatures provided with the updated certificate are valid, the updated certificate is trusted by the client, and may be installed 918 by the client. In some examples, the client uses the trusted updated certificate to update a stored certificate in a pinned certificate store.

In some embodiments an X.509 certificate used by TLS endpoints can be signed by two or more CAs. The validity of the X.509 certificate can be based at least in part on a combination of constraints relating to the organizational independence of the signing CAs. For example, a combination of CAs from diverse geographical locations or a combination of CAs from diverse legal jurisdictions may be required to determine the validity of the X.509 certificate. Determining validity in this way mitigates the ability of a single compromised CA to act as a single point of failure.

Figure 10:
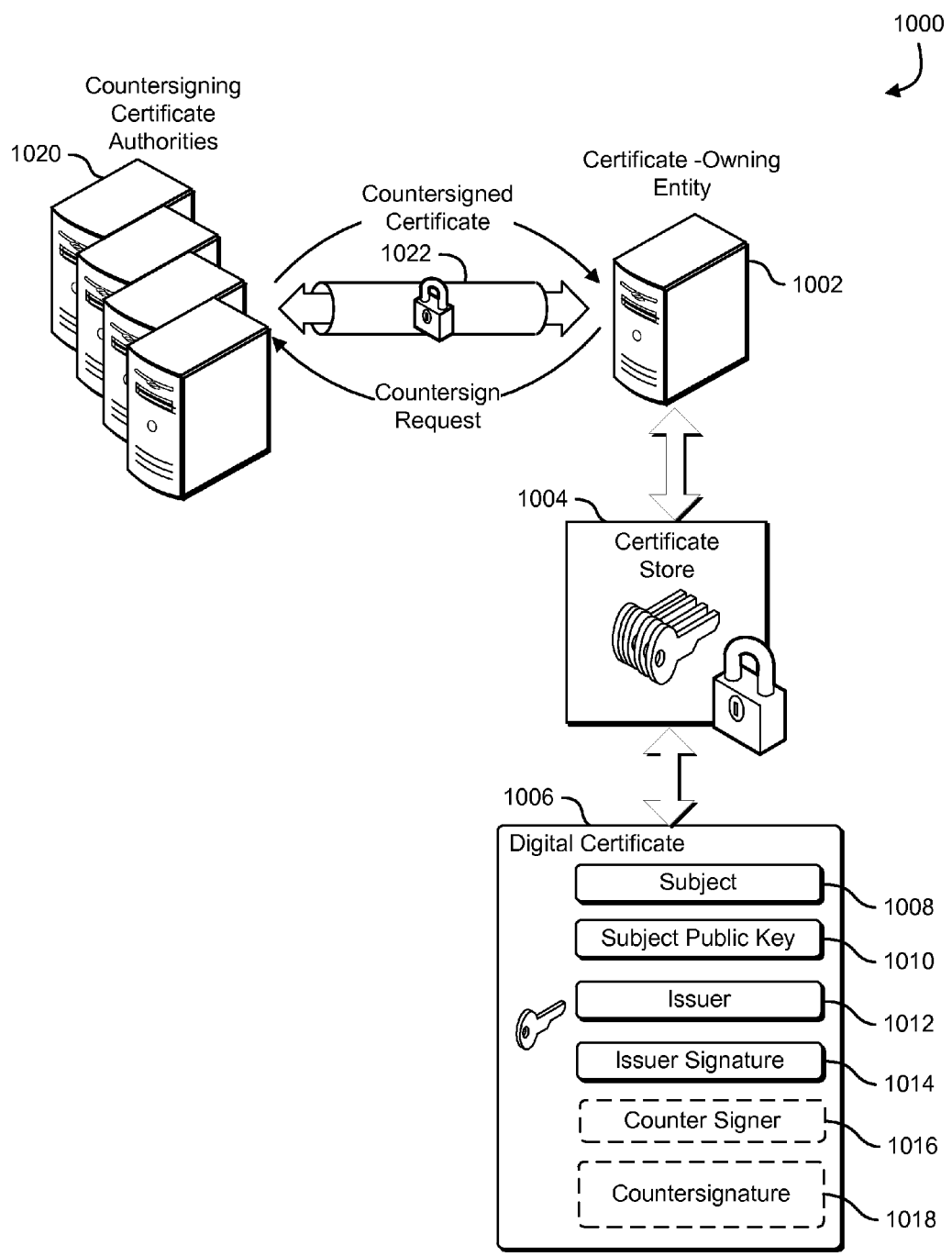
FIG. 10 shows an illustrative example of a system that generates countersigned digital certificates, in accordance with an embodiment.

FIG. 10 shows an illustrative example of a system that generates countersigned digital certificates, in accordance with an embodiment. A system diagram 1000 includes a certificate-owning entity 1002. The certificate-owning entity 1002 maintains a certificate store 1004. The certificate store 1004 retains a set of digital certificates such as a set of pinned certificates. A digital certificate 1006 that is stored in the certificate store 1004 includes a subject field 1008 a subject public key 1010, and issuer 1012, and issuer signature 1014, a counter signer field 1016, and a countersignature 1018. The counter signer field 1016 identifies a particular certificate authority from a set of countersigning certificate authorities 1020. The countersignature 1018 is a digital signature of the particular certificate authority.

If the certificate-owning entity 1002 receives a digital certificate, the certificate-owning entity can request the addition of a countersignature to the digital certificate. In one example, the certificate-owning entity 1002 establishes a TLS connection 1022 to a particular certificate authority within the set of countersigning certificate authorities 1020, and provides the digital certificate 1006 to the particular certificate authority with a request for a countersignature. The particular certificate authority approves the request for the countersignature by at least in part verifying the identity of the subject specified in the subject field 1008. As a result of approving the request for the countersignature, the particular certificate authority adds information that identifies the particular certificate authority to the counter signer field 1016, and provides the countersignature 1018 by at least in part signing the digital certificate 1006 with a private key of the particular certificate authority.

The certificate-owning entity 1002 can validate the digital certificate 1006 using a combination of digital signatures provided by and issuing certificate authority and counter signing certificate authorities. A particular certificate authority can have a digital certificate that specifies a geographic location associated with the certificate authority, legal jurisdiction information for the certificate authority, a measure describing the strength of identity verification used by the certificate authority, as well as identifying information for the certificate authority. In some embodiments, the certificate-owning entity 1002 uses a combination of attributes provided by the digital certificates of certificate authorities that have signed the digital certificate 1006. In one example, as a condition to validate a digital certificate 1006, the certificate-owning entity 1002 requires a threshold number of entities to sign the digital certificate 1006. In another example, the certificate-owning entity 1002 requires that the digital certificate 1006 be validly signed by certificate authorities from at least a threshold number of distinct geographic regions. In yet another example, the certificate-owning entity 1002 requires that the digital certificate 1006 be validly signed by certificate authorities that represent at least the threshold number of distinct legal jurisdictions. In yet another example, the certificate-owning entity 1002 requires that the digital certificate 1006 be validly signed by certificate authorities that, in aggregate, have an identity-verification-strength measure that exceeds a threshold value.

Figure 11:
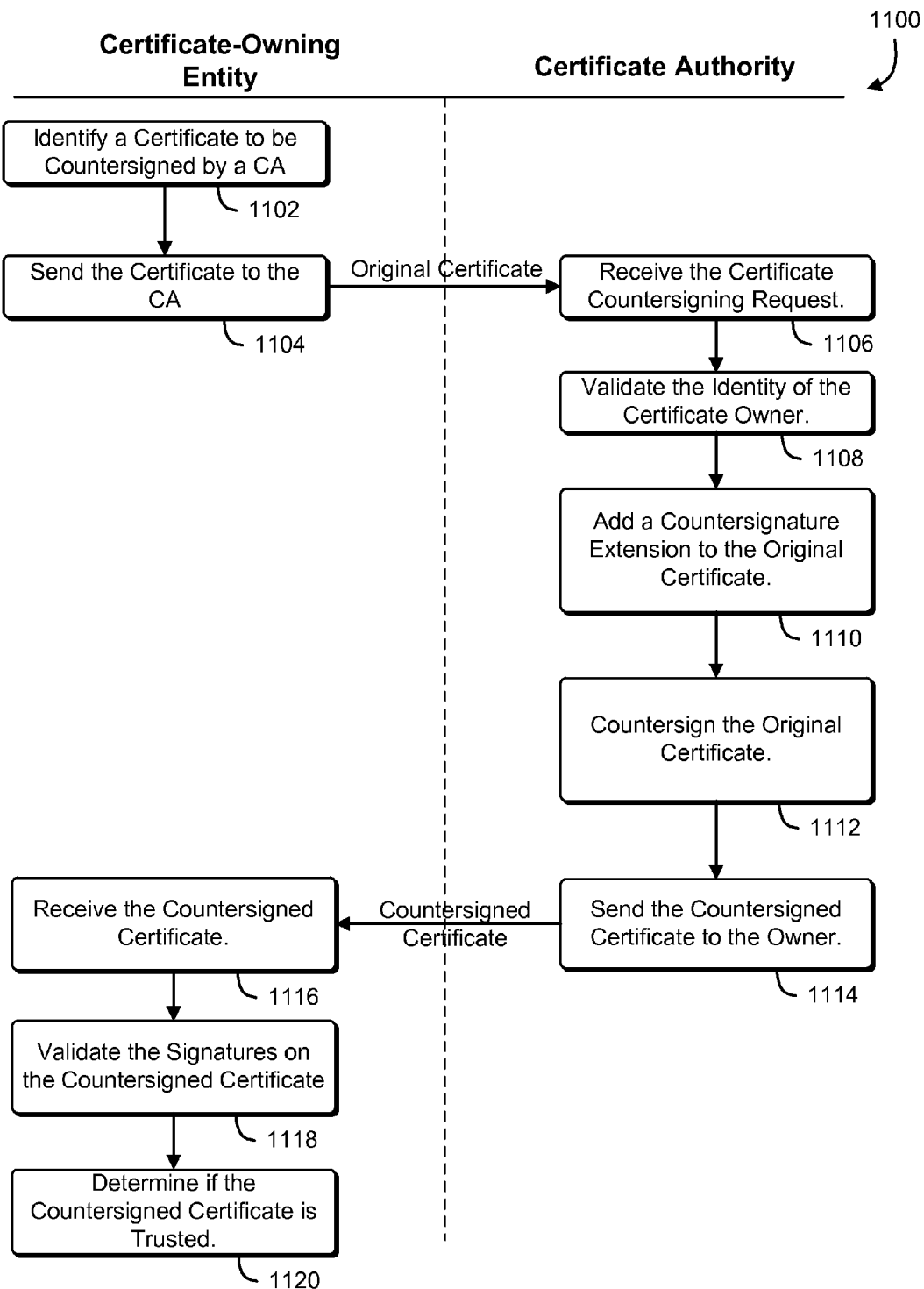
FIG. 11 shows an illustrative example of a process that, when performed by a certificate-owning entity and a certificate authority, countersigns a digital certificate, in accordance with an embodiment.

FIG. 11 shows an illustrative example of a process that, when performed by a certificate-owning entity and a certificate authority, countersigns a digital certificate, in accordance with an embodiment. A swim diagram 1100 illustrates a process that begins at block 1102 where a certificate-owning entity identifies an original certificate to be countersigned. The certificate-owning entity may determine that the original certificate should be countersigned when the existing signatures on the original certificate are insufficient for the certificate-owning entity to determine that the original certificate is trusted. For example, the original certificate may require a certificate authority associated with another geographic area or legal jurisdiction in order for the certificate-owning entity to trust the digital certificate. As a result, the certificate-owning entity can provide the digital certificate to a certificate authority associated with the other geographic area or legal jurisdiction for countersignature. At block 1104, the certificate-owning entity sends the original certificate to the certificate authority to be countersigned.

The certificate authority receives the original certificate with a request for a countersignature at block 1106. At block 1108, the certificate authority validates the original certificate by at least verifying the identifying information provided in the original certificate. If the certificate authority determines that the original certificate is valid, the certificate authority adds 1110 a countersignature extension to the original certificate. The countersignature extension includes a type field, the value field, and a critical flag. The type field identifies the countersignature extension's type. The critical flag is true if the certificate authority requires that the countersignature extension be supported by a recipient of the countersigned certificate. The value field includes a counter signer identity, a countersignature, and a signature algorithm identifier of the countersignature. The countersignature is created by the certificate authority using the private key of the certificate authority, the signature algorithm identifier identifies the algorithm used to generate the countersignature, and the counter signer identity identifies the certificate authority. At block 1112, the certificate authority generates the countersignature using the identified signature algorithm and records the signature, the signature algorithm, and the counter signer identity in the countersignature extension of the original certificate thereby creating a countersigned certificate. At block 1114, the certificate authority sends the countersigned certificate to the certificate-owning entity.

The certificate-owning entity receives the countersigned certificate at block 1116. At block 1118, the certificate-owning entity validates the signatures on the countersigned certificate including the issuing certificate authority's signature, and any countersigning certificate authority's signatures. The certificate-owning entity determines whether the countersigned certificate is valid based at least in part on a combination of the properties of the issuing entity, and the countersigning entities. If the countersigned certificate is valid, the certificate-owning entity determines 1120 that the countersigned certificate is trusted, and adds the countersigned certificate to a set of pinned certificates, or installs the countersigned certificate into a store of trusted certificates.

Figure 12:
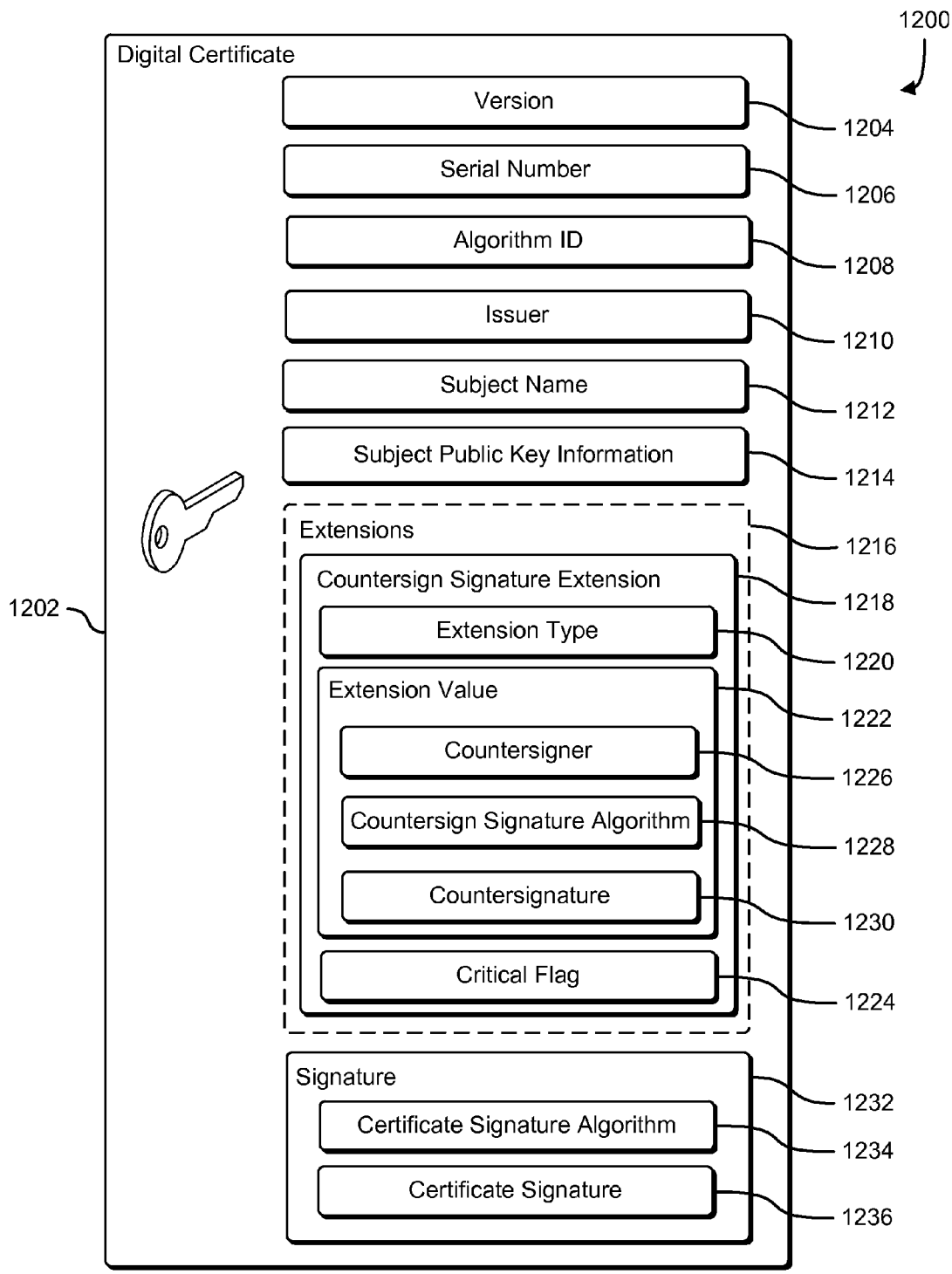
FIG. 12 shows an illustrative example of a digital certificate that includes a countersignature in a certificate extension, in accordance with an embodiment.

FIG. 12 shows an illustrative example of a digital certificate that includes a countersignature in a certificate extension, in accordance with an embodiment. A diagram 1200 illustrates the structure of a digital certificate 1202, such as an X.509 digital certificate. The structure of an X.509 digital certificate is described in RFC 5280 which is hereby incorporated by reference. The digital certificate 1202 includes a version field 1204, a serial number field 1206, an algorithm ID field 1208, an issuer field 1210, a subject name 1212, and subject public key information 1214. The version field 1204 describes the version of the structure of the digital certificate 1202. In some examples, for an X.509 certificate the version field 1204 specifies a version of "3" when extensions are used with the digital certificate 1202. The serial number field 1206 holds an identifier assigned by and issuing certificate authority that is unique to each issued certificate. An algorithm ID field 1208 contains an algorithm identifier that specifies an algorithm that is used by the certificate authority to sign the digital certificate 1202. Various signature algorithms are specified in RFC 3279, RFC 4055, and RFC 4491, which are herein incorporated by reference, but other signature algorithms may also be specified. The issuer field 1210 identifies the entity that has signed an issued the digital certificate 1202. The subject name 1212 identifies the entity associated with the public key identified in the subject public key information 1214.

In various examples, the digital certificate 1202 includes one or more optional extensions. In one example, a list of extensions 1216 includes a countersign signature extension 1218. The countersign signature extension includes an extension type 1220, an extension value 1222, and a critical flag 1224. The extension type 1220 contains an identifier that identifies the countersign signature extension 1218 as a countersign-signature-type of extension. The critical flag 1224 specifies whether the countersign signature extension 1218 must be implemented by a recipient of the digital certificate 1202. For the countersign signature extension 1218, the critical flag 1224 may be false if the owner of the digital certificate 1202 does not require a recipient to confirm the authenticity of the digital certificate 1202 with the information contained in the countersign signature extension 1218. If the owner of the digital certificate 1202 requires a recipient to confirm the authenticity of the digital certificate 1202 using the information contained in the countersign signature extension 1218, the critical flag 1224 may be set to true. The extension value 1222 includes a countersigner field 1226, a countersign signature algorithm 1228 and a countersignature 1230. The countersigner field 1226 identifies the certificate authority that provides a countersignature. The countersign signature algorithm 1228 identifies a signature algorithm used to generate the countersignature 1230. The countersign signature algorithm 1228 may be an algorithm specified in RFC 3279, RFC 4055, RFC 4491, or other cryptographic signature algorithm. The countersignature 1230 holds a digital signature of the certificate authority identified in the countersigner field 1226.

The digital certificate 1202 includes a signature 1232. The signature 1232 includes a certificate signature algorithm 1234 and a certificate signature 1236. The certificate signature algorithm 1234 is an identifier that identifies an algorithm used to generate the certificate signature 1236. The algorithm may be an algorithm specified in RFC 3279, RFC 4055, RFC 4491, or other cryptographic signature algorithm. The certificate signature 1236 is generated by the entity identified by the subject name 1212, using a private key associated with the subject public key information 1214.

Figure 13:
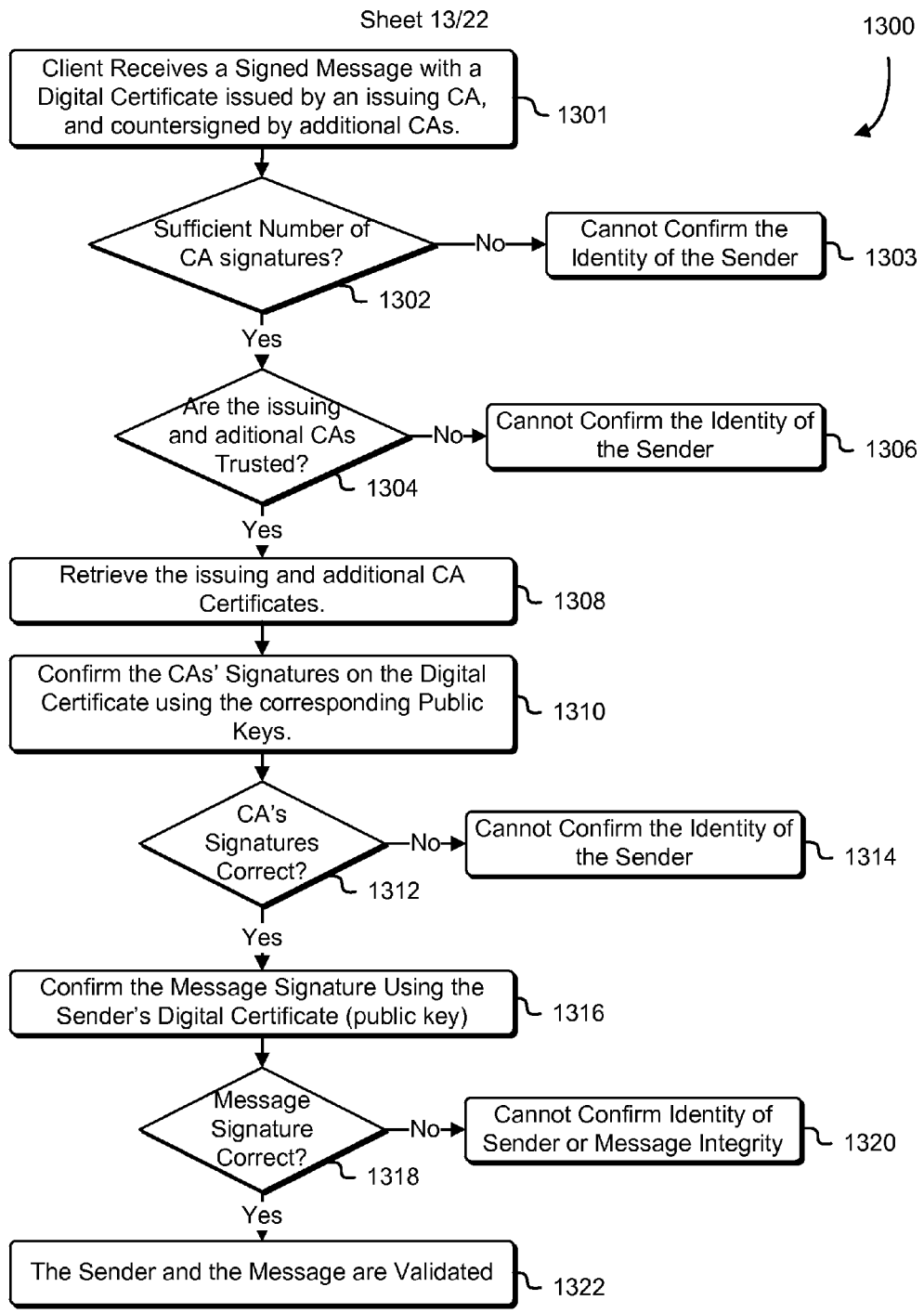
FIG. 13 shows an illustrative example of a process that, when performed by a client, validates a message that is signed using a digital certificate that includes at least one countersignature, in accordance with an embodiment.

FIG. 13 shows an illustrative example of a process that, when performed by a client, validates a message that is signed using a digital certificate that includes at least one countersignature, in accordance with an embodiment. A process diagram 1300 illustrates a process that begins at block 1301 where the client receives a signed message and a digital certificate issued by an issuing certificate authority, and countersigned by additional certificate authorities. The client determines 1302 if a sufficient number of certificate authorities have signed the digital certificate by, for example, comparing the number of signatures on the digital certificate to a threshold number of signatures. If the client determines that the number of certificate-authority signatures on the digital certificate not sufficient, execution proceeds to block 1303 and the client determines that the certificate is not trusted. If the client determines that the number of certificate-authority signatures on the digital certificate is sufficient, execution of the process advances to block 1304. At block 1304, the client determines whether the issuing and additional certificate authorities are trusted by the client. If either of the issuing or additional certificate authorities are not trusted by the client, execution proceeds to block 1306, and the client determines that the identity of the sender cannot be confirmed. If the issuing and additional certificate authorities are trusted by the client, execution proceeds to block 1308 and the client retrieves certificates for the issuing and additional certificate authorities. At block 1310, the client validates the signatures on the received digital certificate using the public keys associated with the certificates of the issuing and additional certificate authorities. If the client determines 1312 that either of the signatures of the issuing and additional certificate authorities are invalid, execution proceeds to block 1314 and the client determines that the identity of the sender cannot be confirmed. If the client determines 1312 that the signatures of the issuing and additional certificate authorities are valid, execution proceeds to block 1316 and the client confirms the signature of the sender that is on the received message using the public key contained within the digital certificate received with the message. If the client determines that the signature of the sender is invalid, execution proceeds to block 1320 and the client determines that the identity of the sender and/or the integrity of the message cannot be confirmed. If the client determines that the signature of the sender is valid, execution proceeds to block 1322 and the client determines that the received digital certificate identifies the sender, and that the message was signed by the sender.

Figure 14:
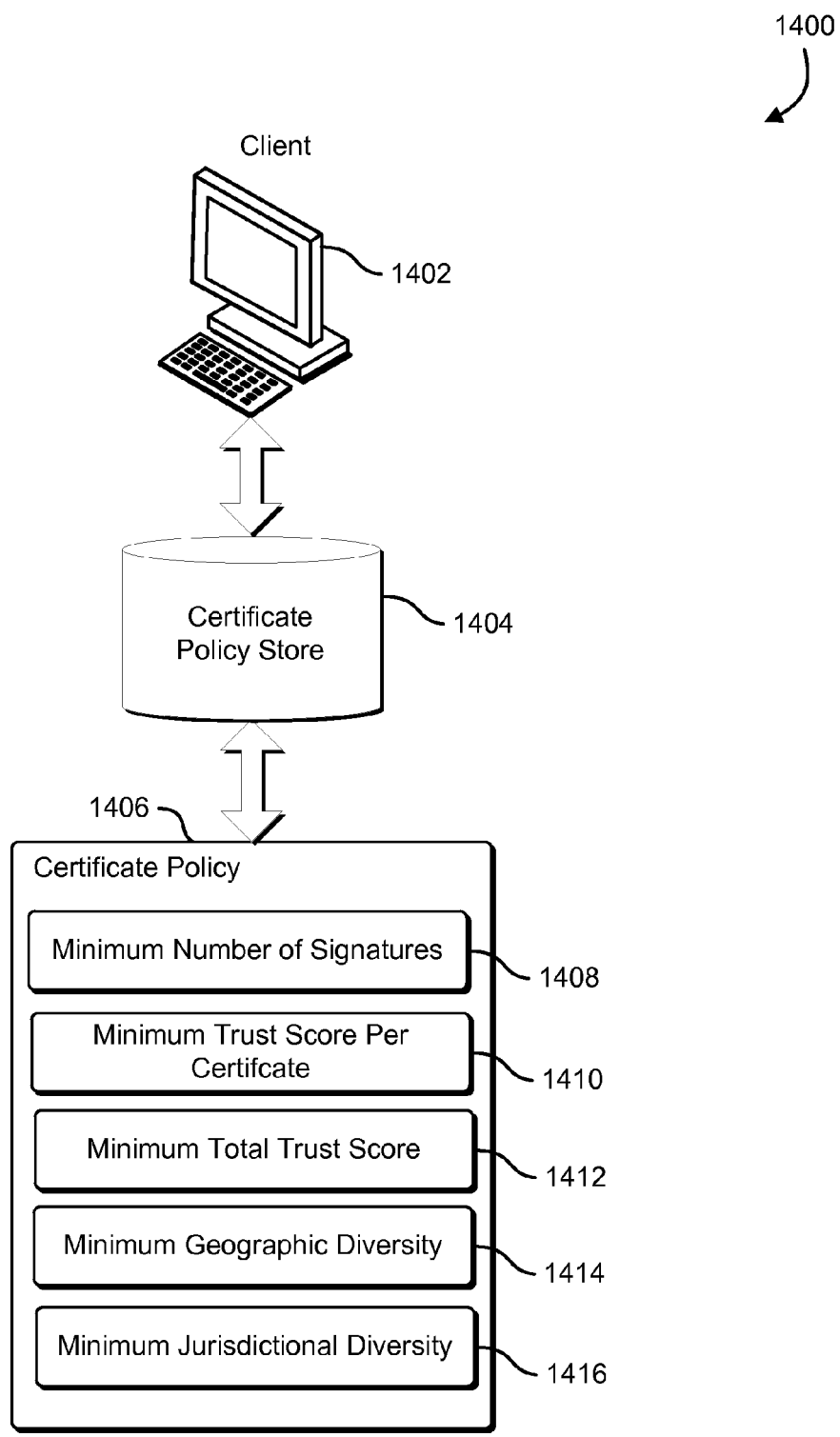
FIG. 14 shows an illustrative example of a system that maintains a set of certificate policies that can be used to validate a certificate, in accordance with an embodiment.

FIG. 14 shows an illustrative example of a system that maintains a set of certificate policies that can be used to validate a certificate, in accordance with an embodiment. A system 1400 includes a client 1402 that maintains a certificate policy store 1404. The certificate policy store 1404 includes a collection of certificate policies that determine combinations of certificate-authority signatures that permit a digital certificate to be validated. The collection of certificate policies are maintained in a database, and each certificate policy in the collection of certificate policies includes a number of data fields that specify requirements for validating a digital certificate. In one example, a certificate policy 1406 includes a minimum number of signatures field 1408, a minimum trust score per certificate field 1410, a minimum total trust score field 1412, a minimum geographic diversity field 1414, and a minimum jurisdictional diversity field 1416. If a particular data field is empty for a particular certificate policy, the constraint associated with the particular data field is not evaluated. For example, if the minimum trust score per certificate field 1410 is empty for a particular certificate policy, the minimum trust score condition is deemed satisfied.

The minimum number of signatures field 1408 specifies a minimum number of valid certificate authority signatures that must be present on a digital certificate in order for the client 1402 to trust the digital certificate. In one example, the client 1402 assigns each certificate authority that signs a digital certificate a trust score based at least in part on the level of identity verification performed by the certificate authority. In another example, the certificate of each certificate authority that signs a digital certificate includes a trust score that is based at least in part on the level of identity verification performed by the certificate authority. For a particular digital certificate that is signed by multiple certificate authorities, the trust score of the particular digital certificate is determined by adding the trust score of each signing certificate authority. The minimum trust score per certificate field 1410 specifies a minimum trust score for each certificate authority that signs the digital certificate. If any certificate authority that signs a digital certificate has a trust score lower than the trust score specified in the minimum trust score per certificate field 1410, the client determines that the digital certificate is invalid. The minimum total trust score field 1412 specifies a minimum total trust score for the certificate authorities that sign the digital certificate. If the total trust score for the certificate authorities that sign the digital certificate is less than the specified minimum total trust score, the client 1402 determines that the digital certificate is invalid. The minimum geographic diversity field 1414 specifies a minimum number of distinct geographic regions that must be represented by certificate authorities that sign the digital certificate. If the number of distinct geographic regions represented by the certificate authorities that sign the digital certificate is less than the minimum geographic diversity, the client 1402 determines that the digital certificate is invalid. The minimum jurisdictional diversity field 1416 specifies a minimum number of distinct legal jurisdictions that must be represented by the certificate authorities that sign the digital certificate. If the number of distinct jurisdictions represented by the certificate authorities is less than the minimum jurisdictional diversity field 1416, the client 1402 determines that the digital certificate is invalid.

When the client 1402 receives a digital certificate, the client 1402 reads the certificate policies in the certificate policy store 1404 and evaluates the constraints defined by each certificate policy to determine whether the received digital certificate is valid. In one example, each certificate policy includes a logical flag that indicates whether the constraint specified by each certificate policy is combined with a logical "and" or a logical "or" operation with other certificate policies. For example, if the logical flag for a particular certificate policy specifies a logical "and" operation, the particular certificate policy must be satisfied in addition to all other certificate policies in the certificate policy store 1404. In another example, if the logical flag for a particular certificate policy specifies a logical "or" operation, satisfaction of the particular certificate policy validates a received digital certificate regardless of the satisfaction of other certificate policies in the certificate policy store 1404.

Figure 15:
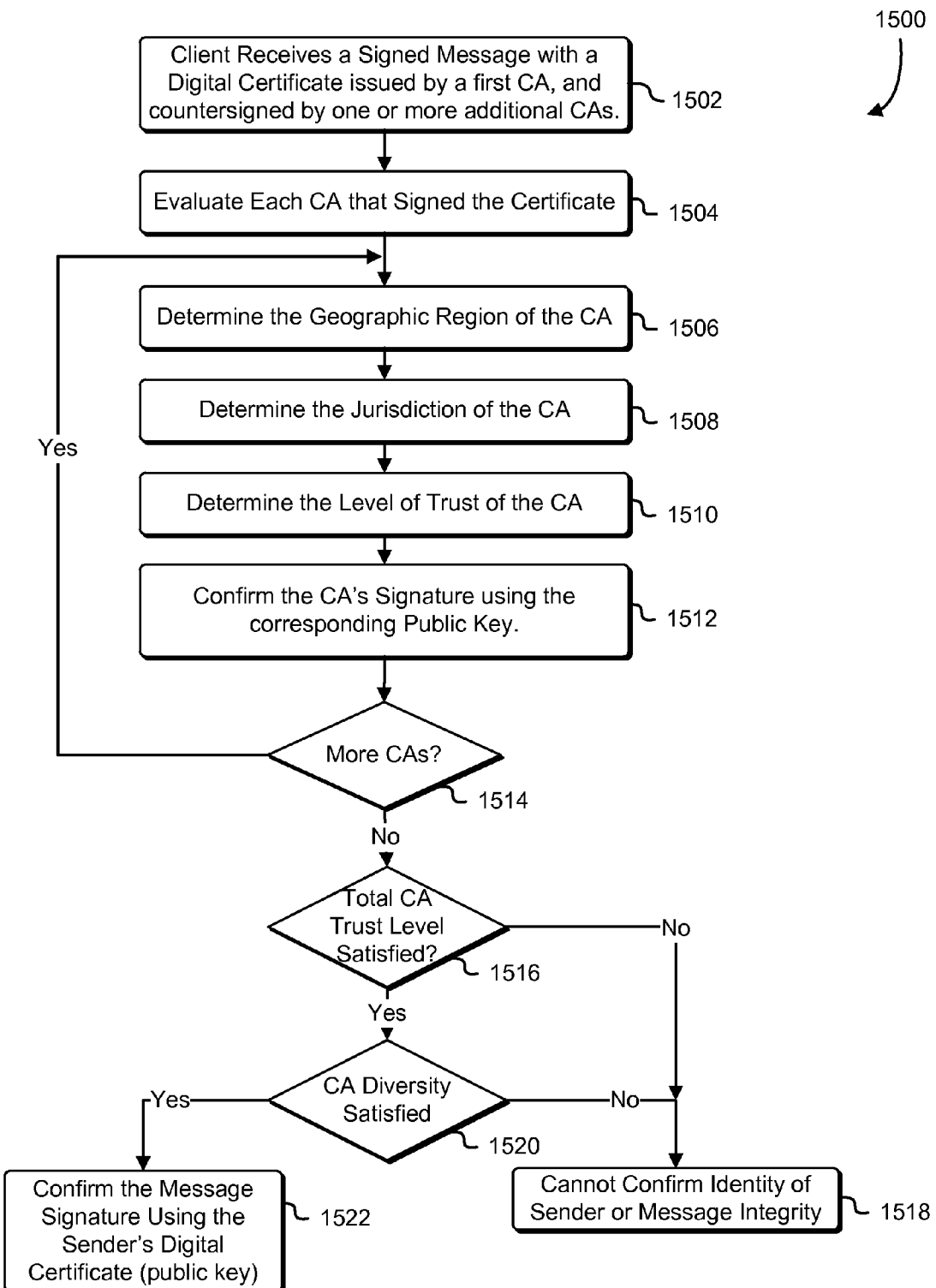
FIG. 15 shows an illustrative example of a process that, when performed by a client, validates a message that is signed using a digital certificate that includes at least one countersignature, according to a certificate policy, in accordance with an embodiment.

FIG. 15 shows an illustrative example of a process that, when performed by a client, validates a message that is signed using a digital certificate that includes at least one countersignature, according to a certificate policy, in accordance with an embodiment. A process diagram 1500 begins at block 1502 with a client that receives a signed message and a digital certificate issued by a first certificate authority and countersigned by one or more additional certificate authorities.

At block 1504, a loop is initiated that evaluates each certificate authority that signs the received digital certificate. For each certificate authority, the client determines 1506 the geographic region of the certificate authority. The geographic region of the certificate authority may be determined by examining the digital certificate of the certificate authority, or by identifying a geographic region based at least in part on identifying information contained in the certificate authority's digital certificate. At block 1508, the client determines the jurisdiction of the certificate authority. The jurisdiction of the certificate authority may be determined using information contained in the digital certificate of the certificate authority, or by inferring a jurisdiction based at least in part on the determined geographic region of the certificate authority. At block 1510, the client determines the level of trust of the certificate authority. The level of trust of the certificate authority may be determined by examining the identifying procedures used by the certificate authority when issuing digital certificates, or by extracting a provided trust measure from the digital certificate of the certificate authority. At block 1512, the client confirms the certificate authority's digital signature on the digital certificate using the public key of the certificate authority. If the client determines 1514 that there are additional certificate authority signatures, the loop index advances to the next certificate authority and execution returns to block 1506. If the client determines 1514 that there are not additional certificate authority signatures to be processed, execution proceeds to block 1516 and the client determines whether a threshold total level of trust is met by the certificate authorities that have signed the digital certificate. If the total level of trust is not met by the certificate authorities that have signed the digital certificate, execution proceeds to block 1518 and the client determines that the digital certificate is not trusted. If the total level of trust is met by the certificate authorities that have signed the digital certificate, execution proceeds to block 1520 where the client determines whether the signing certificate authorities satisfy a level of geographic diversity and a level of jurisdictional diversity. If the client determines that the level of geographic diversity and the level of jurisdictional diversity are met, execution proceeds to block 1522 and the client determines that the digital certificate is trusted. At block 1522, the client confirms the message signature using the provided digital certificate.

In some examples, the client examines a collection of signing certificate authorities, and assigns a score to each signing certificate authority. The score may be determined by evaluating characteristics of the certificate authority that are indicative of trustworthiness. For example, the certificate authority may be assigned a higher score as the certificate authority has been operating for a longer period of time, whereas newer and less-proven certificate authorities may be assigned a lower score. The scores assigned by the client may be combined to determine a quorum that allows the digital certificate to be trusted by the client. For example, the client can add the scores of the signing certificate authorities to determine a total score. In another example, the client can determine a maximum score of the signing certificate authorities. In yet another example, the client can get determine an average score of the signing certificate authorities. The quorum of signing certificate authorities can be determined based at least in part on these or other statistical measures.

Figure 16:
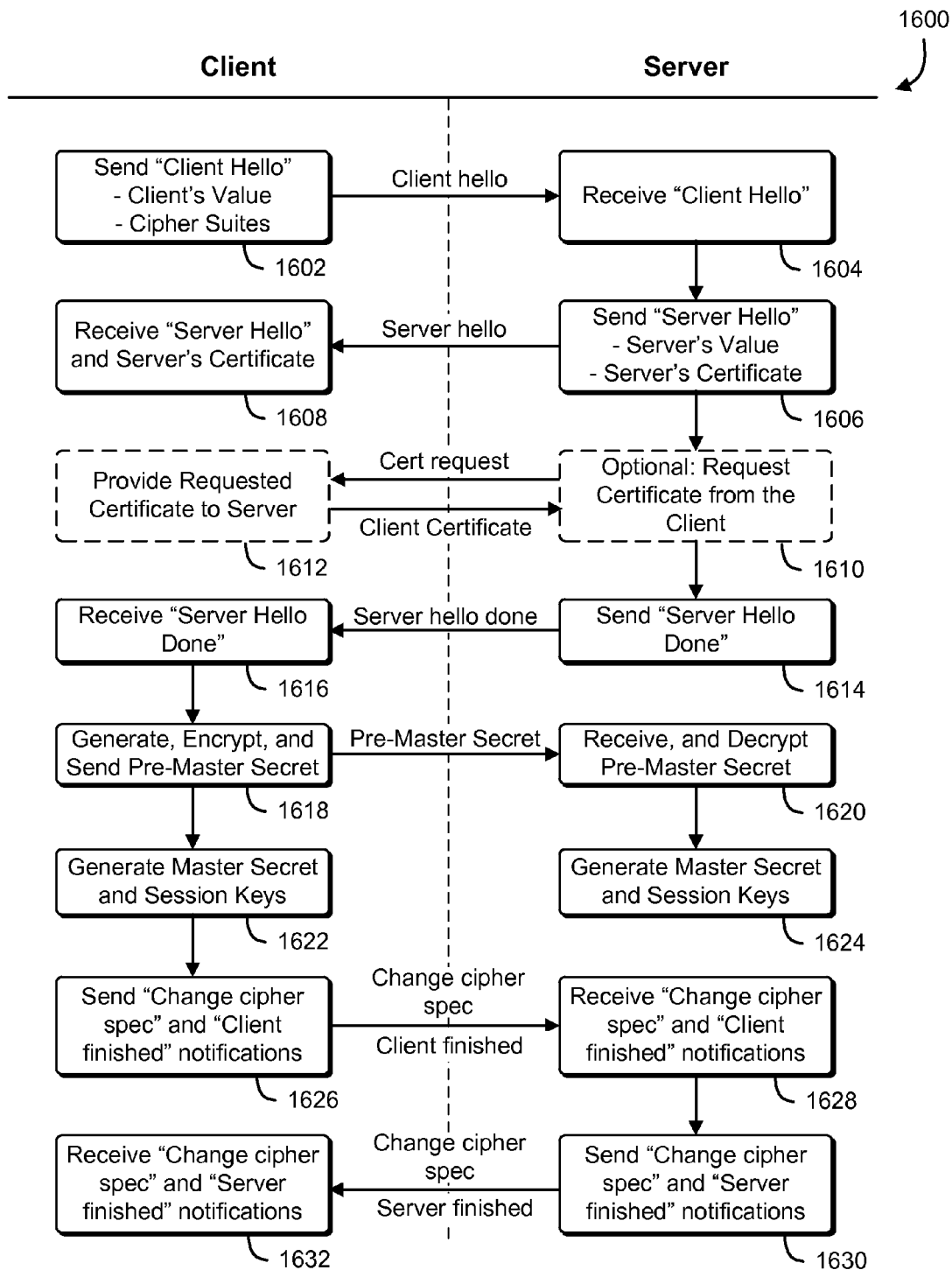
FIG. 16 shows an illustrative example of a process that, when performed by a client and a server, establishes a secure connection using the TLS protocol, in accordance with an embodiment.

FIG. 16 shows an illustrative example of a process that, when performed by a client and a server, establishes a secure connection using the TLS protocol, in accordance with an embodiment. A swim diagram 1600 illustrates a TLS handshake process that begins at block 1602. At block 1602, the client sends a "Client hello" message to the server. The "Client hello" message includes a value that is randomly generated by the client, and a list of cipher suites. The server receives 1604 the "Client hello" message from the client, and determines an acceptable set of mutually supported cipher suites, and determines a selected cipher suite, based at least in part on the list of cipher suites provided by the client. At block 1606, the server sends a "Server hello" message to the client including the selected cipher suite, the server's digital certificate, and a value that is randomly generated by the server. The server's digital certificate includes a certificate extension that identifies a collection of cipher suites supported by the server. The client receives 1608 the "Server hello" message from the server along with the server's certificate, a randomly generated value, and the selected cipher suite. The client validates the identity of the server using the server's provided certificate. The client extracts the collection of cipher suites supported by the server from the server's digital certificate, and confirms that the selected cipher suite is represented in the collection of cipher suites included in the server's digital certificate. If the selected cipher suite is not represented in the collection of cipher suites included in the server's digital certificate, the client determines that the secure connection is being subjected to a "forced downgrade" attack, and can terminate the connection, or renegotiate the cipher suite with the server.

In some implementations, the client provides a digital certificate that proves the identity of the client to the server. At block 1610, the server sends a request to the client for the client's digital certificate. At block 1612, the client responds to the request by providing the client's digital certificate to the server. If the client does not provide the requested digital certificate, the server may respond with a fatal handshake failure alert. If the client provides a certificate that is unacceptable, for example a certificate that is not signed by a known, trusted CA, the server may send a fatal alert. The client can provide a certificate that includes a certificate extension that specifies a collection of supported cipher suites. The server can confirm that the selected cipher suite is represented in the collection of supported cipher suites in the client's digital certificate. If the selected cipher suite is not represented in the collection of supported cipher suites in the client's digital certificate, the server determines that the secure connection may be under a "forced downgrade" attack and may terminate the connection or renegotiate the cipher suite with the client.

At block 1614, the server sends a "Server hello done" message to the client. The client receives 1616 the "Server hello done" message, and proceeds to block 1618 where the client generates, encrypts and sends a pre-master secret to the server. At block 1620, the server receives and decrypts the pre-master secret. Using the pre-master secret, the client generates a master secret and session keys at block 1622. At block 1624, the server generates a master secret and session keys. The client signals 1626 that client will be switching to a secure cipher by sending a "change cipher spec" message to the server, followed by a "client finished" message. The server receives the "change cipher spec" message and the "client finished" message at block 1628. At block 1630, the server responds with its own "change cipher spec" message followed by a "server finished" message. The client receives the "change cipher spec" and the "server finished" message at block 1632.

Once the process illustrated in the swim diagram 1600 is completed, the secure session has been negotiated between the client and server. The client and the server can continue to transmit application data, secured by the negotiated cipher suite, using a record protocol.

Additional information describing the TLS protocol (Version 1.2) is contained in RFC 5246 which is incorporated herein by reference.

Figure 17:
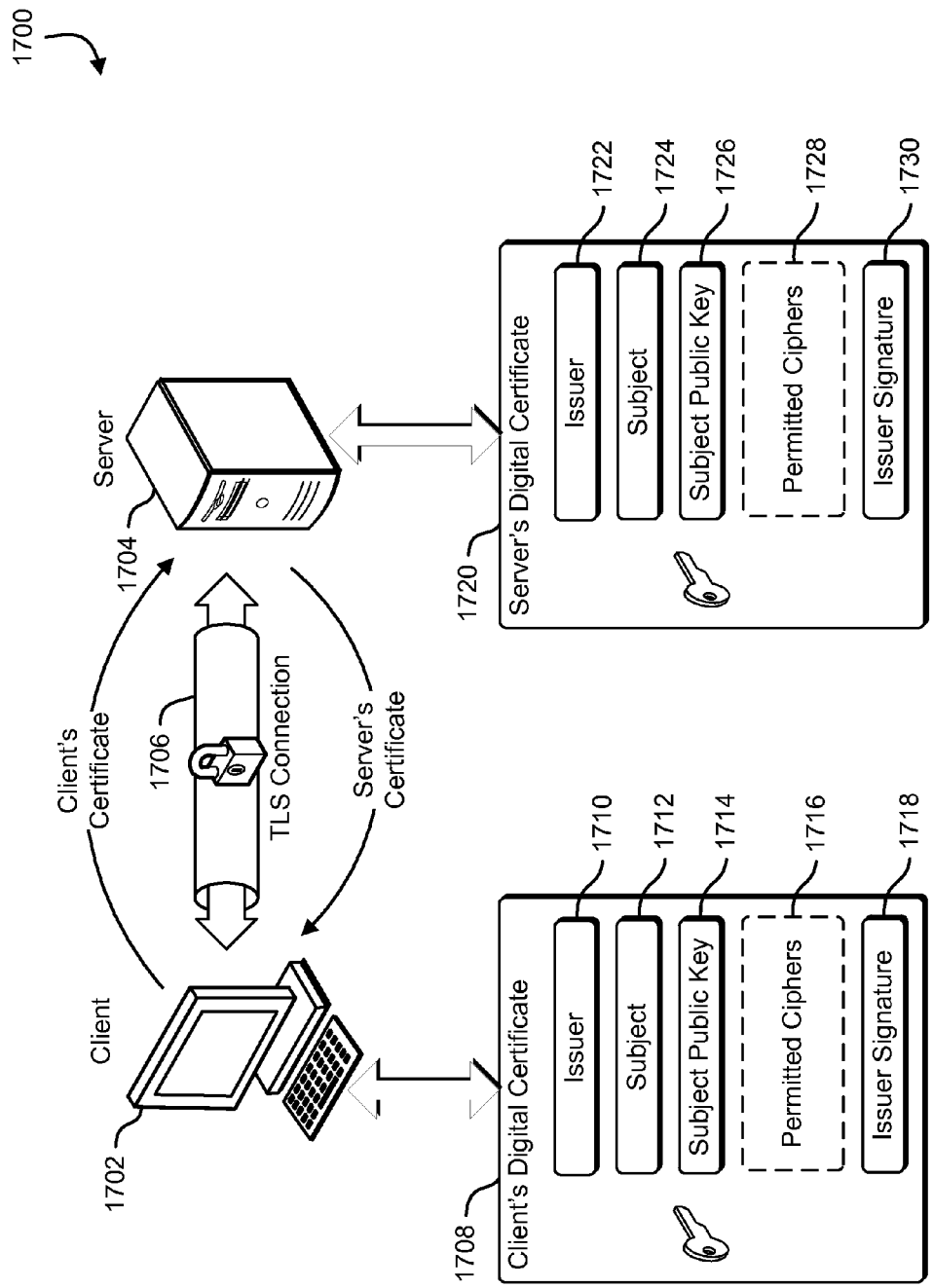
FIG. 17 shows an illustrative example of a system that negotiates a cipher suite used for a TLS connection based at least in part on a set ciphers specified in the digital certificates of the client and the server, in accordance with an embodiment.

FIG. 17 shows an illustrative example of a system that negotiates a cipher suite used for a TLS connection based at least in part on a set of ciphers specified in the digital certificates of the client and the server, in accordance with an embodiment. A system 1700 includes a client 1702 and the server 1704 that communicate over a TLS connection 1706. The client has a client's digital certificate 1708. The client's digital certificate includes an issuer field 1710, a subject field 1712, a subject public key field 1714, a list of permitted ciphers 1716, and an issuer signature 1718. The issuer field 1710 identifies the certificate authority that issued the client's digital certificate 1708. The subject field 1712 identifies the client 1702. The subject public key field 1714 contains the public key of a public-private key pair owned by the client 1702. The list of permitted ciphers 1716 identifies a number of TLS cipher suites that the client 1702 will accept when communicating via the TLS connection 1706. The issuer signature 1718 is a digital signature of the certificate authority that issued the client's digital certificate 1708. The server 1704 has a server's digital certificate 1720. Server's digital certificate 1720 includes an issuer field 1722, a subject field 1724, a subject public key field 1726, a list of permitted ciphers 1728, and an issuer signature 1730. The issuer field 1722 identifies the certificate authority that issued the server's digital certificate 1720. The subject field 1724 identifies the server 1704. The subject public key field 1726 holds a public key of a public-private key pair maintained by the server 1704. The list of permitted ciphers 1728 specifies a set of cipher suites that are acceptable to the server 1704 when communicating over the TLS connection 1706. The issuer signature 1730 is a digital signature of the certificate authority that issued the server's digital certificate 1720.

When the client 1702 and the server 1704 establish the TLS connection 1706, the server 1704 provides the server's digital certificate 1720 to the client 1702. As a result of establishing the TLS connection 1706, the client 1702 and the server 1704 negotiate a cipher suite for use with the TLS connection 1706. The client confirms that the server's digital certificate 1720 is valid, and extracts the set of permitted ciphers 1728 from the server's digital certificate 1720. If the negotiated cipher suite is not present in the set of permitted ciphers 1728, the client 1702 determines that the TLS connection 1706 is under attack, and can terminate the connection or initiate the renegotiation of the cipher suite. In some examples, the client 1702 provides the client's digital certificate 1708 to the server 1704 during a TLS handshake that establishes the TLS connection 1706. The server 1704 extracts the list of permitted ciphers 1716 from the client's digital certificate 1708 and confirms that the negotiated cipher suite is present in the list of permitted ciphers 1716. If the negotiated cipher suite is not present in the list of permitted ciphers 1716, the server determines that the TLS connection 1706 is under attack and can terminate the connection, or initiate a renegotiation of the cipher suite.

In some embodiments, the list of permitted ciphers 1716 or the list of permitted ciphers 1728 can be provided in a separate data store that links particular digital certificates to a set of permitted cipher suites. In one example, the server 1704 selects a cipher suite for use with the TLS connection 1706. The client accesses a local database that includes information that identifies a set of permitted cipher suites for the server 1704. If the cipher suite selected by the server is not contained in the set of permitted cipher suites, the client terminates the TLS connection 1706.

Figure 18:
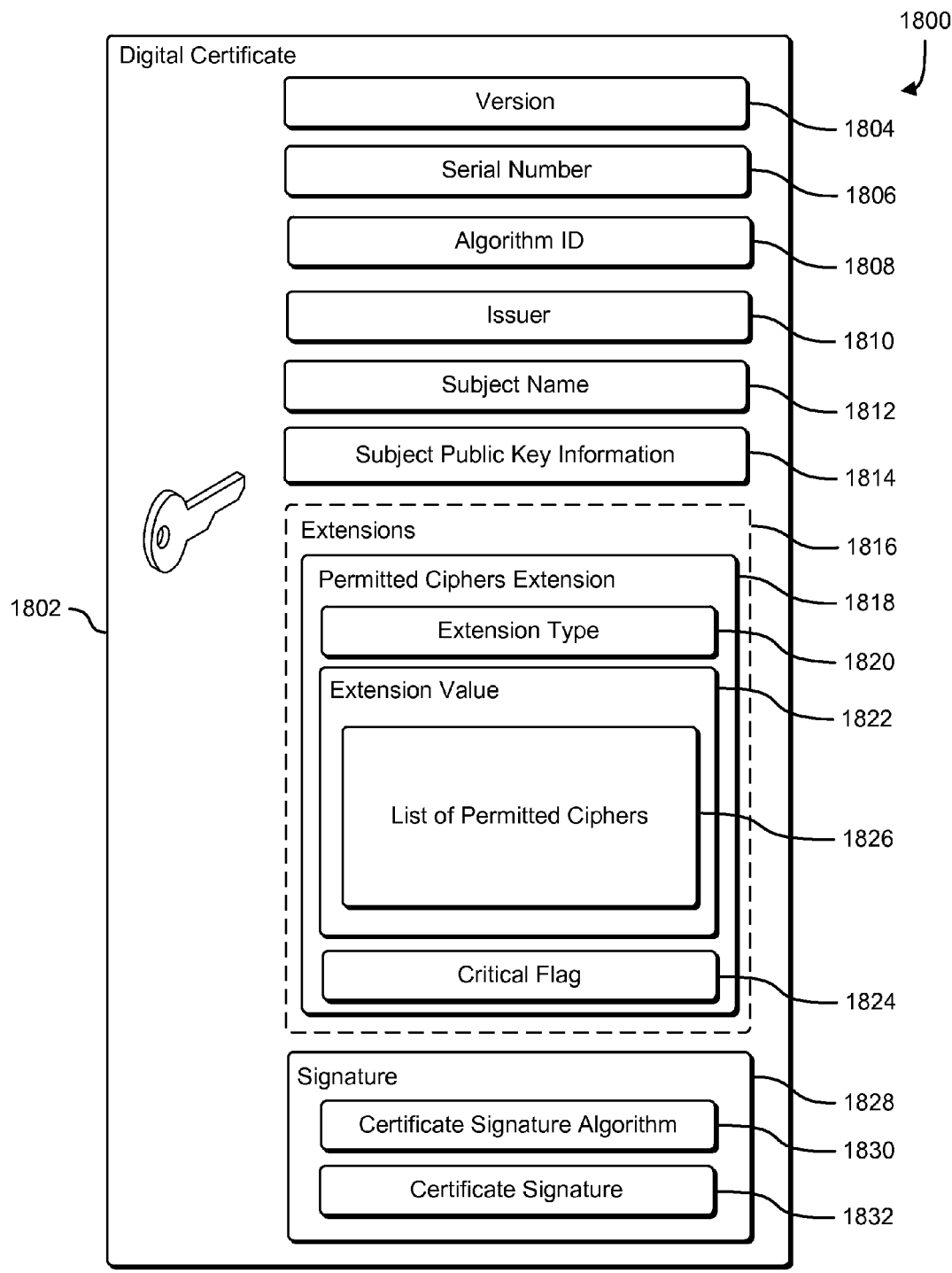
FIG. 18 shows an illustrative example of a digital certificate that identifies a set of acceptable ciphers in a certificate extension, in accordance with an embodiment.

FIG. 18 shows an illustrative example of a digital certificate that identifies a set of acceptable ciphers in a certificate extension, in accordance with an embodiment. A diagram 1800 illustrates the structure of a digital certificate 1802, such as an X.509 digital certificate. The structure of an X.509 digital certificate is described in RFC 5280 which is hereby incorporated by reference. The digital certificate 1802 includes a version field 1804, a serial number field 1806, an algorithm ID field 1808, an issuer field 1810, a subject name 1812, and subject public key information 1814. The version field 1804 describes the version of the structure of the digital certificate 1802. For example, for an X.509 certificate, the version field 1804 can specify a version of 3 when extensions are used with the digital certificate 1802. The serial number field 1806 holds an identifier assigned by an issuing certificate authority that is unique to each issued certificate. An algorithm ID field 1808 contains an algorithm identifier that specifies an algorithm that is used by the certificate authority to sign the digital certificate 1802. Various signature algorithms are specified in RFC 3279, RFC 4055, and RFC 4491, which are herein incorporated by reference, but other signature algorithms may also be specified. The issuer field 1810 identifies the entity that has signed and issued the digital certificate 1802. The subject name 1812 identifies the entity associated with the public key identified in the subject public key information 1814.

In various examples, the digital certificate 1802 includes one or more optional extensions. In one example, a list of extensions 1816 includes a permitted ciphers extension 1818. The permitted ciphers extension includes an extension type 1820, an extension value 1822, and a critical flag 1824. The extension type 1820 contains an identifier that identifies the permitted ciphers extension 1818 as a permitted-ciphers-type of extension. The critical flag 1824 specifies whether the permitted ciphers extension 1818 must be implemented by a recipient of the digital certificate 1802. For the permitted ciphers extension 1818, the critical flag 1824 may be false if the owner of the digital certificate 1802 does not require a recipient to confirm a cipher suite negotiated during the establishment of a TLS connection with the information contained in the permitted ciphers extension 1818. If the owner of the digital certificate 1802 requires a recipient to confirm the cipher suite negotiated during the establishment of a TLS connection using the information contained in the permitted ciphers extension 1818, the critical flag 1824 may be set to true. The extension value 1822 includes a list of permitted ciphers 1826. The list of permitted ciphers 1826 identifies a set of cipher suites that may be used with a TLS connection with the owner of the digital certificate 1802.

The digital certificate 1802 includes a signature 1828. The signature 1828 includes a certificate signature algorithm 1830 and a certificate signature 1832. The certificate signature algorithm 1830 is an identifier that identifies an algorithm used to generate the certificate signature 1832. The algorithm may be an algorithm specified in RFC 3279, RFC 4055, RFC 4491, or other cryptographic signature algorithm. The certificate signature 1832 is generated by the entity identified by the subject name 1812, using a private key associated with the subject public key information 1814.

Figure 19:
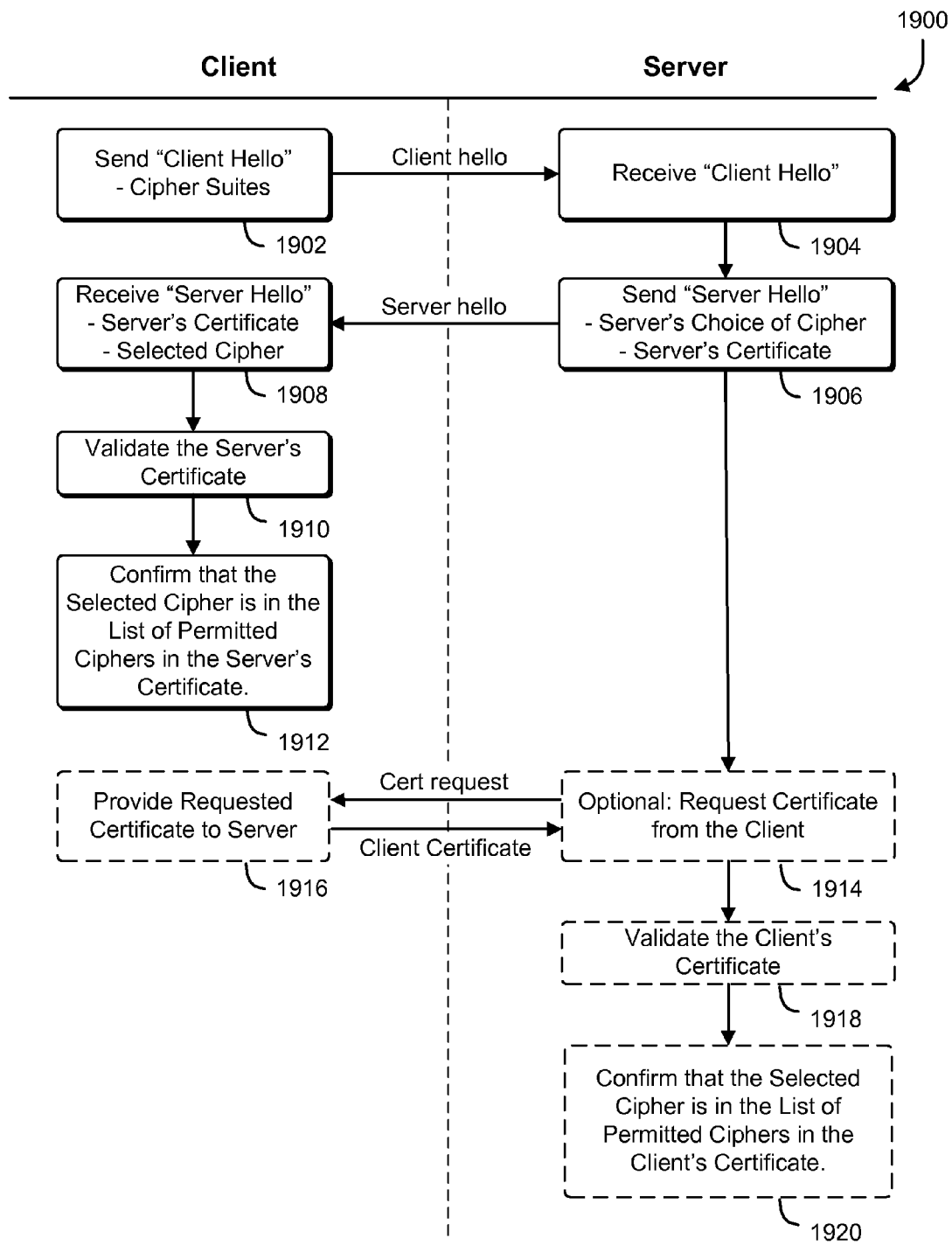
FIG. 19 shows an illustrative example of a process that, when performed by a client and a server, negotiates a cipher suite for use with a TLS connection, in accordance with an embodiment.

FIG. 19 shows an illustrative example of a process that, when performed by a client and a server, negotiates a cipher suite for use with a TLS connection, in accordance with an embodiment. A swim diagram 1900 illustrates a process that begins at block 1902 where a client initiates the TLS connection by sending a client hello message to the server. The client hello message includes, within the client hello message, a list of cipher suites supported by the client. The server receives 1904 the client hello message that includes the list of cipher suites supported by the client. The server examines the list of cipher suites supported by the client, and determines a particular cipher suite supported by both the client and the server based at least in part on the ordering of the cipher-suite list provided by the client. The server sends 1906 a server hello message to the client that includes the determined particular cipher suite as well as the server's digital certificate. At block 1908, the client receives a server hello message with the determined cipher suite and the server certificate. The client validates 1910 the received server's certificate by at least in part confirming the digital signature of the issuer of the server's certificate. At block 1912, the client extracts a list of permitted cipher suites from the server's digital certificate, and confirms that the determined cipher suite is present in the list of permitted cipher suites in the server's digital certificate. If the determined cipher suite is not present in the list of permitted cipher suites in the server's digital certificate, the client determines that a "forced downgrade" attack may be occurring, and can terminate the TLS connection, or initiate a renegotiation of the cipher suite between the client and the server.

In some examples, the server requests 1914 a digital certificate from the client. At block 1916, the client provides the client's certificate to the server. As a result of receiving the requested client's certificate, the server validates 1918 the certificate by at least in part validating the digital signature of the certificate authority that issued the client's digital certificate. At block 1920, the server extracts a list of permitted cipher suites from the client's digital certificate, and confirms that the negotiated determined cipher suite is present in the list of permitted cipher suites extracted from the client's digital certificate. If the negotiated determined cipher suite is not present in the list of permitted cipher suites in the client's digital certificate, the server determines that the server may be under a "forced downgrade" attack.

If a "forced downgrade" is suspected, the server can terminate the connection or renegotiate the cipher suite used with the TLS connection.

Figure 20:
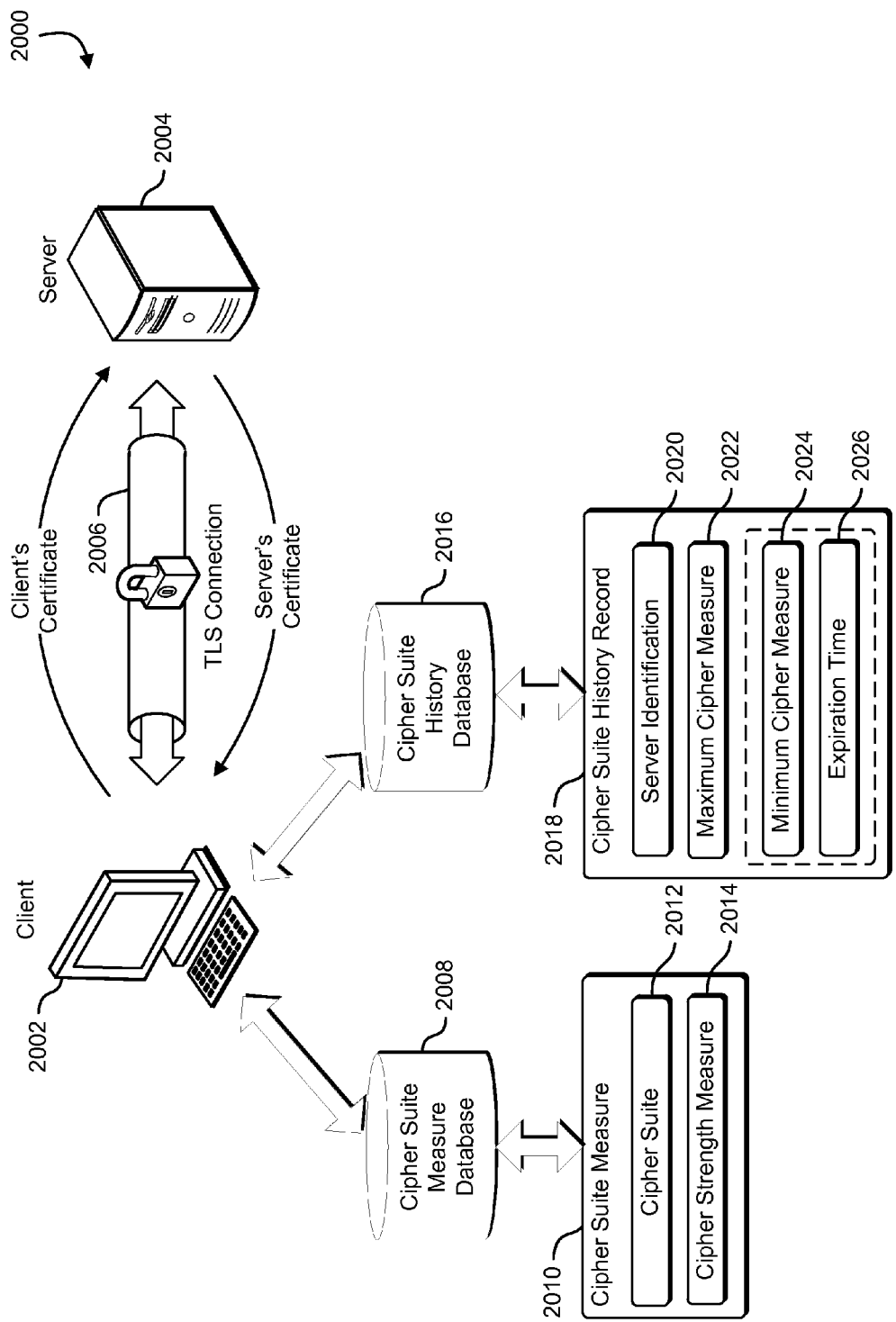
FIG. 20 shows an illustrative example of a system that restricts allowable cipher suites for use with a TLS connection based at least in part on a set of cipher preferences and past use of ciphers by a particular server, in accordance with an embodiment.

FIG. 20 shows an illustrative example of a system that restricts allowable cipher suites for use with a TLS connection based at least in part on a set of cipher preferences and past use of ciphers by a particular server, in accordance with an embodiment. A system 2000 includes a client 2002 and a server 2004 that communicate over a TLS connection 2006. During a TLS handshake associated with the TLS connection 2006, the client 2002 provides a client certificate to the server 2004 and the server 2004 provides a server certificate to the client 2002. The client 2002 and the server 2004 negotiate a cipher suite for use over the TLS connection 2006.

The client 2002 maintains a cipher suite measure database 2008. The cipher suite measure database 2008 includes a collection of cipher suite measures. A cipher suite measure record 2010 is representative of the cipher suite measures in the collection of cipher suite measures. The cipher suite measure record 2010 includes a cipher suite identifier 2012, and a cipher-strength measure 2014. The cipher suite identifier 2012 identifies a particular cipher suite used in a TLS connection. The cipher-strength measure 2014 is an integer value that represents the cryptographic strength of the cipher suite identified by the cipher suite identifier 2012. If a vulnerability is discovered that reduces the security of a particular cipher suite, the cipher-strength measure associated with a particular cipher suite is reduced. If a new cipher suite is developed that provides superior security over existing cipher suites, the new cipher suite can be assigned high cipher-strength measure. The information contained in the cipher suite measure database 2008 can be maintained by a system administrator, and may be downloaded from an authoritative server.

In some examples, the client 2002 maintains a ranking of cipher suites. The ranking provides a cipher-suite ordering in ascending or descending order of security provided by each cipher suite that is ranked. The ranking may include more than one cipher suite at the same ranking level. Cipher suites that have the same ranking are considered equally secure. If a particular cipher suite is found to be vulnerable to attack, the ranking of the particular cipher suite may be downgraded. In some examples, a measure can be implemented as a ranking, and the value of a measure can be a position in a ranking.

As a result of establishing TLS connections to various entities, the client 2002 updates a cipher suite history database 2016. The cipher suite history database 2016 maintains information that identifies cipher suites that have been used with previous TLS connections to particular entities. A cipher suite history record 2018 is representative of records maintained in the cipher suite history database 2016. The cipher suite history record 2018 includes a server identification 2020, and a maximum cipher measure 2022. The server identification 2020 identifies the particular server or entity to which the client 2002 was connected. The maximum cipher measure 2022 identifies the highest cipher-strength measure of all cipher suites of all TLS connections from the client 2002 to the entity identified by the server identification 2020.

In some implementations, when the client 2002 negotiates a cipher suite with the server 2004 for use with the TLS connection 2006, the client queries the cipher suite measure database 2008 and retrieves a cipher suite measure record associated with the negotiated cipher suite. Based at least in part on information included in the retrieved cipher suite measure record, the client 2002 determines a cipher suite strength measure for the negotiated cipher suite. The client 2002 queries the cipher suite history database 2016 and retrieves a cipher suite history record associated with the server 2004. Based at least in part on the retrieved cipher suite history record, the client 2002 determines a maximum cipher measure. If the cipher-strength measure of the negotiated cipher measure is less than the determined maximum cipher measure, the client 2002 rejects the negotiated cipher suite, and may terminate the TLS connection 2006, renegotiate the negotiated cipher suite, or take other corrective action. In some implementations, if the cipher-strength measure of the negotiated cipher suite is greater than the determined maximum cipher measure, the client 2002 updates the maximum cipher measure 2022 in the cipher suite history record that is associated with the server 2004 to the value of the cipher-strength measure of the negotiated cipher suite.

In some examples, a minimum cipher measure 2024 and an expiration time 2026 are included in the cipher suite history record 2018. If the cipher-strength measure of the negotiated cipher suite is greater than the determined maximum cipher measure, the client 2002 updates the minimum cipher measure 2024 with the previous maximum cipher measure 2022, and sets the expiration time 2026 to an expiration time for the previously used cipher suite. In some examples, the expiration time is determined by adding a fixed amount of time to the current time. The maximum cipher measure 2022 is updated to the value of the cipher-strength measure of the negotiated cipher suite. When the client 2002 compares the cipher-strength measure of the negotiated cipher suite to the information in the cipher suite history record 2018, the client 2002 compares the cipher-strength measure of the negotiated cipher suite to the minimum cipher measure 2024 provided that the expiration time 2026 has not expired. If the expiration time 2026 has expired, the client 2002 compares the cipher-strength measure of the negotiated cipher suite to the maximum cipher measure 2022. In this way, when the maximum cipher measure 2022 is increased, the previous maximum cipher measure 2022 is written to the minimum cipher measure 2024, and cipher suites having a cipher-strength measure of at least the minimum cipher measure 2024 will be accepted until the expiration time 2026.

In some embodiments, the server 2004 maintains a second cipher suite measure database and the second cipher suite history database. The second cipher suite history database contains information that identifies cipher suites used by various clients when connecting to the server. The clients may be identified using a network identifier associated with the client, a client's digital certificate, or other client identifying information. When a particular client connects to the server 2004, the server notes the particular cipher suite used by the particular client. If the particular cipher suite is stronger than cipher suites previously used by the particular client, the connection is accepted and later connections from the particular client to the server 2004 will be required to use the particular cipher suite, or another cipher suite having the same or a higher level of security than the particular cipher suite. If the particular cipher suite is weaker than cipher suites used by the particular client in the past, the connection is rejected. If the particular cipher suite has the same level of security as cipher suites used in the past, the connection is accepted. In some implementations, when a stronger cipher suite is used by particular client, weaker cipher suites may be accepted for a period of time as described above with respect to the client 2002.

Figure 21:
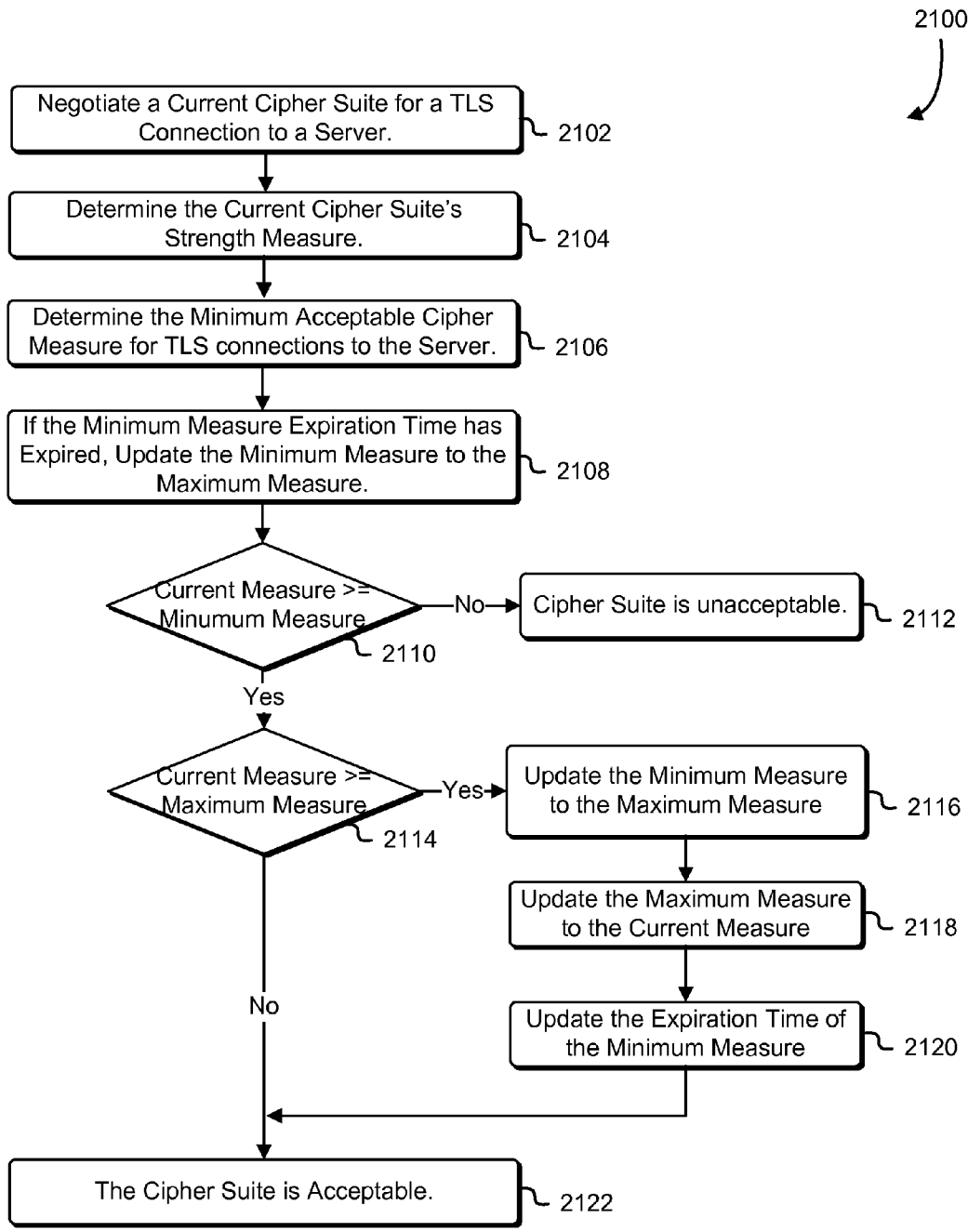
FIG. 21 shows an illustrative example of a process that, when performed by a client, determines if a negotiated cipher suite is acceptable for use with a TLS connection to a particular server, in accordance with an embodiment.

FIG. 21 shows an illustrative example of a process that, when performed by a client, determines if a negotiated cipher suite is acceptable for use with a TLS connection to a particular server, in accordance with an embodiment. A process 2100 begins at block 2102 where the client negotiates a cipher suite for use with a TLS connection to a server. At block 2104, the client determines a cipher-strength measure for the negotiated cipher suite. In some implementations, the client maintains a database that specifies cipher-strength measures for the collection of cipher suites supported by the client. The database containing the cipher-strength measures can be maintained by a system administrator and is periodically updated to reflect known vulnerabilities and newly developed cipher suites. At block 2106, the client queries a database that maintains a record relating to cipher suites used with previous TLS connections to the server. The record includes a minimum acceptable cipher measure for the TLS connection to the server, and an expiration time. At block 2108, the client determines if the expiration time has elapsed. If the expiration time is elapsed, the client updates the record containing the minimum acceptable cipher measure with a maximum cipher measure contained in the record.

The client determines 2110 whether the cipher-strength measure for the negotiated cipher suite is greater than or equal to the minimum acceptable cipher measure. If the cipher-strength measure for the negotiated cipher suite is not greater than or equal to the minimum acceptable cipher measure, execution proceeds to block 2112 and the client determines that the negotiated cipher suite is not acceptable. If the client determines that the negotiated cipher suite is not acceptable, the client can terminate the TLS connection or take other corrective action. If the cipher-strength measure for the negotiated cipher suite is greater than or equal to the minimum acceptable cipher measure, execution proceeds to block 2114. At block 2114, the client determines whether the cipher-strength measure for the negotiated cipher suite is greater than or equal to the maximum cipher measure. If the cipher-strength measure for the negotiated cipher suite is greater than or equal to the maximum cipher measure, execution proceeds to block 2116 and the client updates the minimum acceptable cipher measure to the existing maximum cipher measure. After the existing maximum cipher measure has been copied to the minimum acceptable cipher measure, the client updates 2118 the maximum measure to the cipher-strength measure of the negotiated cipher suite. At block 2120, the client updates the expiration time in the record to an expiration time when the cipher suites having the previous maximum cipher measure will no longer be allowed. In some implementations, the expiration time provides a "grace period" during which ciphers slightly less secure than the most secure cipher will be accepted. At block 2122, the client determines that the cipher suite is acceptable.

Figure 22:
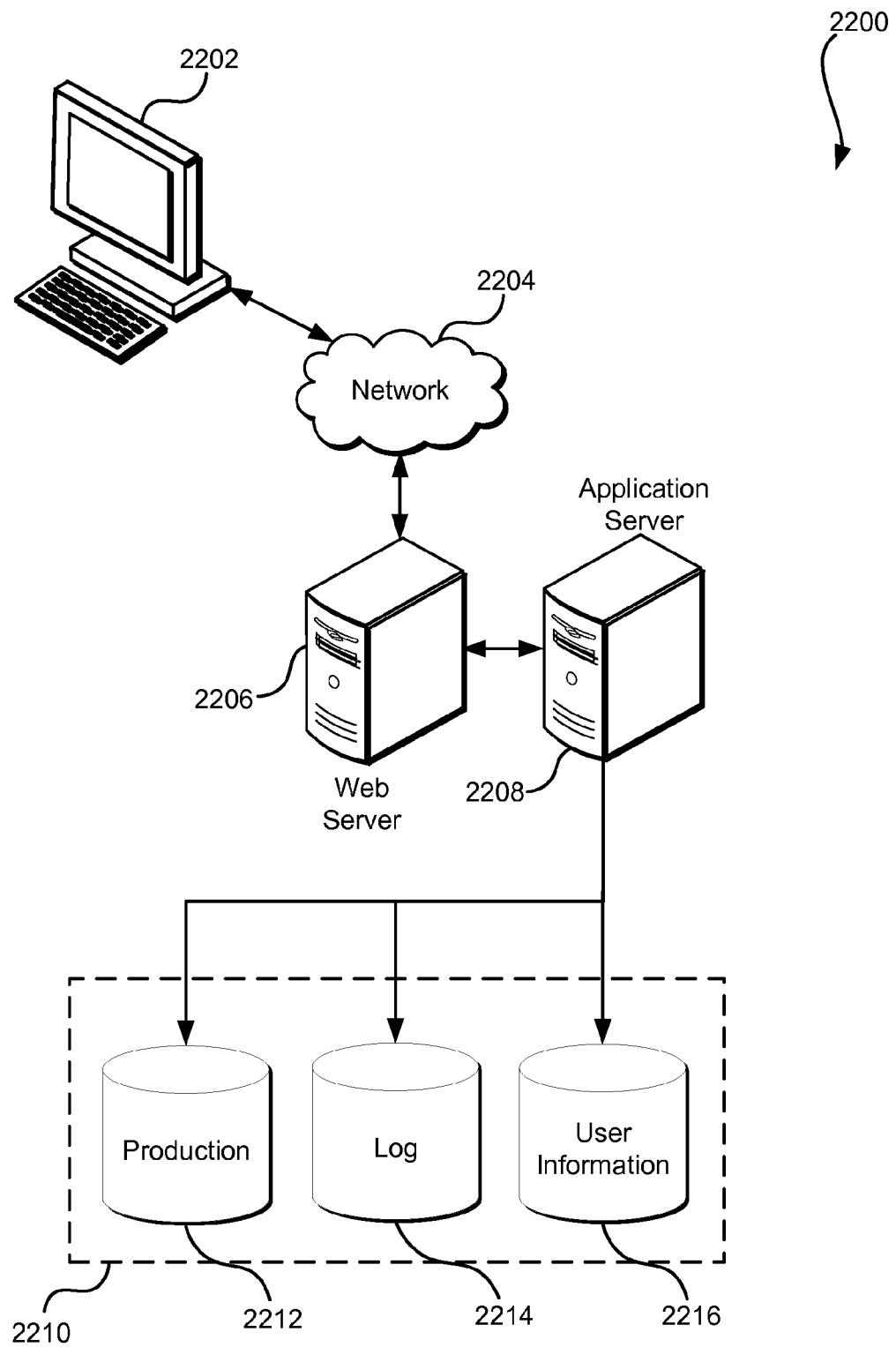
FIG. 22 illustrates an environment in which various embodiments can be implemented.

FIG. 22 illustrates aspects of an example environment for implementing aspects in accordance with various embodiments. As will be appreciated, although a web-based environment is used for purposes of explanation, different environments may be used, as appropriate, to implement various embodiments. The environment includes an electronic client device 2202, which can include any appropriate device operable to send and/or receive requests, messages, or information over an appropriate network 2204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 2206 for receiving requests and serving content in response thereto, although for other networks an alternative device serving a similar purpose could be used as would be apparent to one of ordinary skill in the art.

The illustrative environment includes at least one application server 2208 and a data store 2210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 2202 and the application server 2208, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 2210 can include several separate data tables, databases, data documents, dynamic data storage schemes and/or other data storage mechanisms and media for storing data relating to a particular aspect of the present disclosure. For example, the data store illustrated may include mechanisms for storing production data 2212 and user information 2216, which can be used to serve content for the production side. The data store also is shown to include a mechanism for storing log data 2214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 2210. The data store 2210 is operable, through logic associated therewith, to receive instructions from the application server 2208 and obtain, update or otherwise process data in response thereto. The application server 2208 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 2202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 22. Thus, the depiction of the system 2200 in FIG. 22 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle °, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based at least in part on the disclosure and teachings provided herein, a person of ordinary skill in the art will appreciate other ways and/or methods to implement the various embodiments.

In various embodiments, data objects such as digital certificates may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

Note also that the examples used herein may be performed in compliance with one or more of: Request for Comments (RFC) 4250, RFC 4251, RFC 4252, RFC 4253, RFC 4254, RFC 4255, RFC 4256, RFC 4335, RFC 4344, RFC 4345, RFC 4419, RFC 4432, RFC 4462, RFC 4716, RFC 4819, RFC 5647, RFC 5656, RFC 6187, RFC 6239, RFC 6594, and RFC 6668, which are incorporated by reference.

Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303) and other protocols, such as protocols for secure communication that include a handshake.

Embodiments of the disclosure can be described in view of the following clauses:

1. A computer-implemented method comprising:
under the control of one or more computer systems configured with executable instructions,
receiving an updated digital certificate for a subject entity, the updated digital certificate having a confirming signature that is generated with a private key associated with a previous digital certificate for the subject entity;
identifying the previous digital certificate for the subject entity within a set of pinned digital certificates stored on the one or more computer systems;
determining that the previous digital certificate is not revoked;
determining that the confirming signature is valid using a public key of the previous digital certificate, the public key corresponding to the private key;
adding the updated digital certificate to the set of pinned digital certificates stored for use by the one or more computer systems;
receiving a message purporting to be created by the subject entity, the message including a digital signature generated using an updated private key associated with the updated digital certificate;
locating the updated digital certificate in the set of pinned digital certificates; and
using an updated public key associated with the updated digital certificate and the message to validate the digital signature.

2. The computer-implemented method of clause 1 further comprising:
receiving a second digital certificate for a second subject entity;
determining that the set of pinned digital certificates does not include a digital certificate for the second subject entity; and
as a result of determining that the set of pinned digital certificates does not include a digital certificate for the second subject entity, adding the second digital certificate to the set of pinned digital certificates.

3. The computer-implemented method of any of clauses 1 or 2, further comprising:
receiving a second updated digital certificate for the subject entity, the second updated digital certificate having a second confirming signature that is not generated with a private key associated with a previous digital certificate for the subject entity;
determining that the second confirming signature is not valid using the public key of the previous digital certificate, the public key corresponding to the private key; and
rejecting the updated digital certificate.

4. The computer-implemented method of any of clauses 1 to 3, wherein:
the updated digital certificate includes an X.509 certificate extension that has an extension type field, an extension value field, and a critical flag; and
the extension value field includes the confirming signature and identifies a signature algorithm used to generate the confirming signature.

5. A system, comprising at least one computing device configured to implement one or more services, wherein the one or more services are configured to:
receive a digital certificate for an entity, the digital certificate having a cryptographic signature that is based at least in part on a previous digital certificate that the system is configured to trust;
validate the cryptographic signature of the digital certificate using the previous digital certificate; and
record the received digital certificate as trusted to enable the system to operate in accordance with the certificate being trusted.

6. The system of clause 5, wherein a collection of pinned digital certificates that includes the previous digital certificate, is transferred to the system using an out-of-band communication channel.

7. The system of any of clauses 5 or 6, wherein the system validates the cryptographic signature of the digital certificate using a public key of a public-private key pair that is associated with the previous digital certificate.

8. The system of any of clauses 5 to 7, wherein the one or more services are further configured to, as a condition of recording the received digital certificate as trusted, determine that the previous digital certificate is not revoked.

9. The system of any of clauses 5 to 8, wherein the system is configured to trust the digital certificate by adding the digital certificate to a collection of pinned digital certificates.

10. The system of any of clauses 5 to 9, wherein:
the digital certificate is issued by a certificate authority that the system is configured to trust; and
the digital certificate includes a signature generated using a private key of the certificate authority.

11. The system of any of clauses 5 to 10, wherein the certificate is received from an entity that is described in a subject field contained in the digital certificate.

12. The system of any of clauses 5 to 11, wherein:
the cryptographic signature is generated using a private key accessible to a subject identified by the previous digital certificate; and
the cryptographic signature is validated by using a public key of the previous digital certificate.

13. A non-transitory computer-readable storage medium having stored thereon executable instructions that, when executed by one or more processors of a computer system, cause the computer system to at least:
generate an updated digital certificate that replaces a previous digital certificate;
add a confirming digital signature to the updated digital certificate using a private key associated with the previous digital certificate; and
provide the updated digital certificate to an entity that is configured to trust the previous digital certificate.

14. The non-transitory computer-readable storage medium of clause 13, wherein the instructions further comprise instructions that, when executed by the one or more processors, cause the computer system to self-sign the updated digital certificate with a private key of a public-private key pair that is accessible to the computer system.

15. The non-transitory computer-readable storage medium of any of clauses 13 or 14, wherein the instructions further comprise instructions that, when executed by the one or more processors, cause the computer system to cause the updated digital certificate to be signed by a certificate authority.

16. The non-transitory computer-readable storage medium of any of clauses 13 to 15, wherein:
the confirming digital signature is stored in a certificate extension in the updated digital certificate; and
the certificate extension identifies a signature algorithm used to by the computer system to generate the confirming digital signature.

17. The non-transitory computer-readable storage medium of any of clauses 13 to 16, wherein the instructions further comprise instructions that, when executed by the one or more processors, cause the computer system to cause the previous digital certificate to be revoked.

18. The non-transitory computer-readable storage medium of any of clauses 13 to 17, wherein the instructions further comprise instructions that, when executed by the one or more processors, cause the computer system to generate the updated digital certificate in anticipation that the previous digital certificate is about to expire.

19. The non-transitory computer-readable storage medium of any of clauses 13 to 18, wherein an updated public key that is associated with the updated digital certificate matches a previous public key that is associated with the previous digital certificate.

20. The non-transitory computer-readable storage medium of any of clauses 13 to 19, wherein the instructions further comprise instructions that, when executed by the one or more processors, cause the computer system to add an additional confirming digital signature to the updated digital certificate using an additional private key associated with an additional previous digital certificate.

21. A computer-implemented method, comprising:
under the control of one or more computer systems configured with executable instructions,
receiving a digital certificate, the digital certificate identifying a collection of signing entities and having multiple digital signatures;
determining, based at least in part on a plurality of digital certificates that are individually associated with respective individual entities of the collection of signing entities, that the multiple digital signatures are valid;
determining that the digital certificate is trustworthy based at least in part on a number of signing entities in the collection of signing entities being greater than or equal to a threshold number of signing entities; and
performing an operation in accordance with the digital certificate being trusted.

22. The computer-implemented method of clause 21, further comprising:
identifying a collection of geographic regions that are associated with members of the collection of signing entities; and
determining that the digital certificate is trustworthy based at least in part on a number of distinct geographic regions in the collection of geographic regions being greater than or equal to a threshold number of geographic regions.

23. The computer-implemented method of any of clauses 21 or 22, further comprising:
identifying a collection of legal jurisdictions that are associated with members of the collection of signing entities; and
determining that the digital certificate is trustworthy based at least in part on a number of distinct legal jurisdictions in the collection of legal jurisdictions being greater than or equal to a threshold number of legal jurisdictions.

24. The computer-implemented method of any of clauses 21 to 23, further comprising:
verifying identities of members of the collection of signing entities using a collection of digital certificates issued by a collection of signature authorities;
determining a number of distinct signature authorities in the collection of signature authorities; and
determining that the digital certificate is trustworthy based at least in part on the number of distinct signature authorities being greater than or equal to a threshold number of signature authorities.

25. A system, comprising at least one computing device configured to implement one or more services, wherein the one or more services are configured to:
receive a digital certificate, the digital certificate being signed with a first signature of a first entity, and the digital certificate being signed with a second signature of a second entity;
verify the first signature using a first public key contained in a first digital certificate of the first entity;
verify the second signature using a second public key contained in a second digital certificate of the second entity; and
determine that the digital certificate is trustworthy based at least in part on a comparison of a characteristic of the first entity and the characteristic of the second entity.

26. The system of clause 25, wherein:
the first digital certificate is issued by a first certificate authority;
the second digital certificate is issued by a second certificate authority; and
the first certificate authority does not match the second certificate authority.

27. The system of any of clauses 25 or 26, wherein the comparison includes:
identifying a first country associated with the first entity;
identifying a second country associated with the second entity;
comparing the first country to the second country; and
determining that the digital certificate is trustworthy based at least in part by determining that the first country and the second country are different countries.

28. The system of any of clauses 25 to 27, wherein the one or more services are further configured to:
identify a first legal jurisdiction able to assert control over the first entity;
identify a second legal jurisdiction able to assert control over the second entity; and
determine that the digital certificate is trustworthy based at least in part by determining that the first legal jurisdiction and the second legal jurisdiction are independent of each other.

29. The system of any of clauses 25 to 28, wherein:
the digital certificate includes a first certificate extension field that contains a first identifier of the first entity, the first signature of the first entity, and a first algorithm identifier of a first signature algorithm that is used by the first entity to generate the first signature; and
the digital certificate includes a second certificate extension field that contains a second identifier of the second entity, the second signature of the second entity, and a second algorithm identifier of a second signature algorithm that is used by the second entity to generate the second signature.

30. The system of any of clauses 25 to 29, wherein the one or more services are further configured to:
calculate a first trust score for the first entity;
calculate a second trust score for the second entity; and
determine that the digital certificate is trustworthy based at least in part by determining that a sum of the first trust score and the second trust score is greater than a threshold value.

31. The system of any of clauses 25 to 30, wherein the one or more services are further configured to:
add a third digital signature to the digital certificate using a private key of a public-private key pair accessible to the system.

32. The system of any of clauses 25 to 31, wherein the one or more services are further configured to:
  retrieve a certificate policy from a certificate policy store, the certificate policy specifying the characteristic, and the certificate policy identifying a limitation for the characteristic;
  compare the characteristic of the first entity and the characteristic of the second entity; and
  determine, based at least in part on a result of the comparison, that the limitation is satisfied.

33. A non-transitory computer-readable storage medium having stored thereon executable instructions that, when executed by one or more processors of a computer system, cause the computer system to at least:
  receive a digital certificate that identifies a collection of signing entities and digital signatures;
  determine based at least in part on a plurality of digital certificates that are individually associated with particular entities that are members of the collection of signing entities, that the digital signatures are valid;
  determine that the digital certificate is trustworthy based at least in part on properties of at least two entities that are members of the collection of signing entities; and
  perform an operation in accordance with the digital certificate being trusted.

34. The non-transitory computer-readable storage medium of clause 33, wherein the instructions further comprise instructions that, when executed by the one or more processors, cause the computer system to:
  calculate a total trust score by summing individual trust scores that are associated with the members of the collection of signing entities, the individual trust scores indicating trustworthiness of individual signing entities; and
  determine that the digital certificate is trustworthy based at least in part on the total trust score exceeding a threshold value.

35. The non-transitory computer-readable storage medium of any of clauses 33 or 34, wherein the instructions further comprise instructions that, when executed by the one or more processors, cause the computer system to:
  determine that the collection of signing entities constitutes a quorum; and
  determine that the digital certificate is trustworthy based at least in part on the collection of signing entities constituting a quorum.

36. The non-transitory computer-readable storage medium of any of clauses 33 to 35, wherein the instructions further comprise instructions that, when executed by the one or more processors, cause the computer system to:
  determine a set of geographical locations associated with the collection of signing entities;
  determine a maximum distance between two geographical locations from the set of geographical locations; and
  determine that the digital certificate is trustworthy based at least in part on the maximum distance exceeding a threshold distance.

37. The non-transitory computer-readable storage medium of any of clauses 33 to 36, wherein the instructions further comprise instructions that, when executed by the one or more processors, cause the computer system to:
  identify a weak entity in the collection of signing entities, the weak entity having a lowest trust score that is associated with the members of the collection of signing entities, individual trust scores indicating trustworthiness of individual signing entities; and
  determine that the digital certificate is trustworthy based at least in part on the lowest trust score exceeding a threshold value.

38. The non-transitory computer-readable storage medium of any of clauses 33 to 37, wherein the instructions further comprise instructions that, when executed by the one or more processors, cause the computer system to:
  receive a signed message, the signed message including a sender's digital certificate that identifies a sender; and
  verify that the signed message originated from the sender by at least:
    validating a message signature on the signed message using a public key associated with the sender's digital certificate; and
    validating the sender's digital certificate using the digital certificate.

39. The non-transitory computer-readable storage medium of any of clauses 33 to 38, wherein the instructions further comprise instructions that, when executed by the one or more processors, cause the computer system to:
  initiate a TLS session with an online service;
  receive an online service's digital certificate from the online service; and
  validate the online service's digital certificate using the digital certificate.

40. The non-transitory computer-readable storage medium of any of clauses 33 to 39, wherein the instructions further comprise instructions that, when executed by the one or more processors, cause the computer system to add the digital certificate to a collection of pinned digital certificates maintained in a certificate store, the certificate store being accessible to the computer system.

41. A non-transitory computer-readable storage medium having stored thereon executable instructions that, when executed by one or more processors of a computer system, cause the computer system to at least:
  establish a first connection-oriented communication channel with a service;
  establish, over the first connection-oriented communication channel a first cryptographically protected communications session at least in part by negotiating a first cipher suite used to secure communications over the first connection-oriented communication channel;
  establish a second connection-oriented communication channel with the service;
  after negotiating the first cipher suite, establish, over the second connection-oriented communication channel a second cryptographically protected communications session at least in part by negotiating a second cipher suite;
  determine, based at least in part on a ranking of cipher suites, that the second cipher suite is less secure than the first cipher suite; and
  as a result of determining that the second cipher suite is less secure than the first cipher suite, perform one or more operations that restrict communication over the second connection-oriented communication channel.

42. The non-transitory computer-readable storage medium of clause 41, wherein the instructions that cause the computer system to determine that the second cipher suite is less secure than the first cipher suite further include instructions that cause the computer system to: calculate a first cipher strength measure for the first cipher suite; calculate a second cipher strength measure for the second cipher suite;
  determine that the second cipher strength is less than the first cipher strength measure; and as a result of determining that the second cipher strength is less than the first cipher strength measure, determine that the second cipher suite is less secure than the first cipher suite.

43. The non-transitory computer-readable storage medium of any of clauses 41 or 42, wherein the instructions that cause the computer system to restrict communication over the second connection-oriented communication channel further include instructions that cause the computer system to negotiate a third cipher suite for use with the second communication channel, the third cipher suite indicated, based at least in part on a ranking of cipher suites, to be at least as secure as the first cipher suite.

44. The non-transitory computer-readable storage medium of any of clauses 41 to 43, wherein the instructions further include instructions that cause the computer system to:
receive a digital certificate from the service, the digital certificate including a list of cipher suites that can be used to communicate with the service; and
determine that the second cipher suite is present in the list of cipher suites.

45. A system comprising at least one computing device configured to implement one or more services, wherein the one or more services are configured to:
determine a minimum cipher strength measure for cipher suites that may be used with secure communication sessions with a first computer system, the minimum cipher strength measure based at least in part on previous communication sessions with the first computer system;
establish a secure communication session with the first computer system, the secure communication session using a cipher suite that is determined as a result of establishing the secure communication session;
determine a cipher strength measure for the cipher suite;
determine that the cipher strength measure is less than the minimum cipher strength measure; and
as a result of determining that the cipher strength measure of the communication session is less than the minimum cipher strength measure, modify the communication session.

46. The system of clause 45, wherein the one or more services are configured to modify the communication session by at least in part terminating the communication session.

47. The system of any of clauses 45 or 46, wherein the one or more services are configured to modify the communication session by causing information transmitted over the communication session to be encoded with an additional layer of encryption.

48. The system of clauses 45 to 47, wherein the secure communication session is established by establishing a TLS session with an exchange of TLS handshake messages.

49. The system of clauses 45 to 48, wherein the one or more services are configured to:
identify, over a previous amount of time, a least secure cipher suite that has been accepted for use with previous secure communication sessions with the first computer system;
and determine the minimum cipher strength measure based at least in part on the least secure cipher suite.

50. The system of clauses 45 to 49, wherein the one or more services are further configured to determine the minimum cipher strength measure by at least in part identifying a most secure cipher suite accepted for use with past secure communication sessions to the first computer system.

51. The system of clauses 45 to 50, wherein the one or more services are further configured to determine the cipher strength measure for the cipher suite by at least in part downloading a database of cipher strength measures from an authoritative server.

52. The system of any of clauses 45 to 51, wherein the cipher suite identifies methods for performing authentication, encryption, generating a Message Authentication Code, and performing key-exchange.

53. A non-transitory computer-readable storage medium having stored thereon executable instructions that, when executed by one or more processors of a computer system, cause the computer system to at least:
establish a communication channel with a first entity;
negotiate a cipher suite with the first entity that is used to secure communications over the communication channel;
receive a first entity's digital certificate, the first entity's digital certificate identifying a collection of cipher suites that are usable with the communication channel;
determine that the cipher suite is not identified in the collection of cipher suites; and
as a result of determining that the cipher suite is not identified in the collection of cipher suites, altering the communication channel.

54. The non-transitory computer-readable storage medium of clause 53, wherein the instructions further comprise instructions that, when executed by the one or more processors, cause the computer system to validate the first entity's digital certificate by at least in part validating a signature on the first entity's digital certificate using a public key of a certificate authority trusted by the computer system.

55. The non-transitory computer-readable storage medium of any of clauses 53 or 54, wherein the collection of cipher suites is described in a certificate extension, certificate extension having a critical flag that indicates to the computer system that the certificate extension must be processed by the computer system.

56. The non-transitory computer-readable storage medium of any of clauses 53 to 55, wherein the instructions further comprise instructions that, when executed by the one or more processors, cause the computer system to provide a second entity's digital certificate to the first entity, the second entity's digital certificate identifying a second set of cipher suites that are usable with the communication channel.

57. The non-transitory computer-readable storage medium of any of clauses 53 to 56, wherein the instructions that cause the computer system to alter the communication channel further include instructions that cause the computer system to close the communication channel.

58. The non-transitory computer-readable storage medium of any of clauses 53 to 57, wherein the instructions that cause the computer system to alter the communication channel further include instructions that cause the computer system to negotiate, with the first entity, a different cipher suite for use with the communication channel, the different cipher suite identified in the collection of cipher suites included in the first entity's digital certificate.

59. The non-transitory computer-readable storage medium of any of clauses 53 to 58, wherein the instructions that cause the computer system to receive the first entity's digital certificate further include instructions that cause the computer system to receive the first entity's digital certificate from the first entity as part of a handshake that establishes the communication channel.

60. The non-transitory computer-readable storage medium of any of clauses 53 to 59, wherein the instructions further comprise instructions that, when executed by the one or more processors, cause the computer system to provide a notification that a forced downgrade attack has occurred.

In the preceding and following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a digital certificate, the digital certificate identifying a collection of signing entities and having an issuer signature and a countersignature;
   determining, based at least in part on a plurality of digital certificates that are individually associated with respective individual entities of the collection of signing entities, that the issuer signature and countersignature are valid;
   determining that the digital certificate is trustworthy based at least in part on a number of signing entities in the collection of signing entities contributing to the issuer signature and countersignature being greater than or equal to a threshold number of signing entities; and
   performing an operation in accordance with the digital certificate being trusted.

2. The computer-implemented method of claim 1, further comprising:
   identifying a collection of geographic regions that are associated with members of the collection of signing entities; and determining that the digital certificate is trustworthy based at least in part on a number of distinct geographic regions in the collection of geographic regions being greater than or equal to a threshold number of geographic regions.

3. The computer-implemented method of claim 1, further comprising:
identifying a collection of legal jurisdictions that are associated with members of the collection of signing entities; and
determining that the digital certificate is trustworthy based at least in part on a number of distinct legal jurisdictions in the collection of legal jurisdictions being greater than or equal to a threshold number of legal jurisdictions.

4. The computer-implemented method of claim 1, further comprising:
verifying identities of members of the collection of signing entities using a collection of digital certificates issued by a collection of signature authorities;
determining a number of distinct signature authorities in the collection of signature authorities; and
determining that the digital certificate is trustworthy based at least in part on the number of distinct signature authorities being greater than or equal to a threshold number of signature authorities.

5. A system, comprising:
one or more processors; and
memory that stores computer-executable instructions that, as a result of being executed, cause the system to:
receive a digital certificate, the digital certificate having an issuer signature and a countersignature, the digital certificate being signed with a first signature of a first entity, and the digital certificate being signed with a second signature of a second entity;
verify the first signature using a first public key contained in a first digital certificate of the first entity;
verify the second signature using a second public key contained in a second digital certificate of the second entity; and
determine that the digital certificate is trustworthy based at least in part on a number of signing entities contributing to the issuer signature and countersignature being greater than or equal to a threshold number of signing entities.

6. The system of claim 5, wherein:
the first digital certificate is issued by a first certificate authority;
the second digital certificate is issued by a second certificate authority; and
the first certificate authority does not match the second certificate authority.

7. The system of claim 5, wherein the one or more processors and memory that stores computer-executable instructions that, as a result of being executed, further cause the system to:
identify a first country associated with the first entity;
identify a second country associated with the second entity;
compare the first country to the second country; and
determine that the digital certificate is trustworthy based at least in part by determining that the first country and the second country are different countries.

8. The system of claim 5, wherein the one or more processors and memory that stores computer-executable instructions that, as a result of being executed, further cause the system to:
identify a first legal jurisdiction able to assert control over the first entity;
identify a second legal jurisdiction able to assert control over the second entity; and
determine that the digital certificate is trustworthy based at least in part by determining that the first legal jurisdiction and the second legal jurisdiction are independent of each other.

9. The system of claim 5, wherein:
the digital certificate includes a first certificate extension field that contains a first identifier of the first entity, the first signature of the first entity, and a first algorithm identifier of a first signature algorithm that is used by the first entity to generate the first signature; and
the digital certificate includes a second certificate extension field that contains a second identifier of the second entity, the second signature of the second entity, and a second algorithm identifier of a second signature algorithm that is used by the second entity to generate the second signature.

10. The system of claim 5, wherein the one or more processors and memory that stores computer-executable instructions that, as a result of being executed, further cause the system to:
calculate a first trust score for the first entity;
calculate a second trust score for the second entity; and
determine that the digital certificate is trustworthy based at least in part by determining that a sum of the first trust score and the second trust score is greater than a threshold value.

11. The system of claim 5, wherein the one or more processors and memory that stores computer-executable instructions that, as a result of being executed, further cause the system to:
add a third digital signature to the digital certificate using a private key of a public-private key pair accessible to the system.

12. The system of claim 5, wherein the one or more processors and memory that stores computer-executable instructions that, as a result of being executed, further cause the system to:
retrieve a certificate policy from a certificate policy store, the certificate policy specifying a characteristic, and the certificate policy identifying a limitation for the characteristic;
compare the characteristic of the first entity and the characteristic of the second entity; and
determine, based at least in part on a result of the comparison, that the limitation is satisfied.

13. A non-transitory computer-readable storage medium having stored thereon executable instructions that, as a result of being executed by one or more processors of a computer system, cause the computer system to at least:
receive a digital certificate that identifies a collection of signing entities and includes an issuer signature and a countersignature;
determine based at least in part on a plurality of digital certificates that are individually associated with particular entities that are members of the collection of signing entities, that the issuer signature and countersignature are valid;
determine that the digital certificate is trustworthy based at least in part on a number of signing entities in the collection of signing entities contributing to the issuer signature and countersignature being greater than or equal to a threshold number of signing entities; and perform an operation in accordance with the digital certificate being trusted.

14. The non-transitory computer-readable storage medium of claim 13, wherein the instructions further comprise instructions that, as a result of being executed by the one or more processors, cause the computer system to:
calculate a total trust score by summing individual trust scores that are associated with the members of the collection of signing entities, the individual trust scores indicating trustworthiness of individual signing entities; and
determine that the digital certificate is trustworthy based at least in part on the total trust score exceeding a threshold value.

15. The non-transitory computer-readable storage medium of claim 13, wherein the instructions further comprise instructions that, as a result of being executed by the one or more processors, cause the computer system to:
determine that the collection of signing entities constitutes a quorum; and
determine that the digital certificate is trustworthy based at least in part on the collection of signing entities constituting a quorum.

16. The non-transitory computer-readable storage medium of claim 13, wherein the instructions further comprise instructions that, as a result of being executed by the one or more processors, cause the computer system to:
determine a set of geographical locations associated with the collection of signing entities;
determine a maximum distance between two geographical locations from the set of geographical locations; and
determine that the digital certificate is trustworthy based at least in part on the maximum distance exceeding a threshold distance.

17. The non-transitory computer-readable storage medium of claim 13, wherein the instructions further comprise instructions that, as a result of being executed by the one or more processors, cause the computer system to:
identify a weak entity in the collection of signing entities, the weak entity having a lowest trust score that is associated with the members of the collection of signing entities, individual trust scores indicating trustworthiness of individual signing entities; and
determine that the digital certificate is trustworthy based at least in part on the lowest trust score exceeding a threshold value.

18. The non-transitory computer-readable storage medium of claim 13, wherein the instructions further comprise instructions that, as a result of being executed by the one or more processors, cause the computer system to:
receive a signed message, the signed message including a sender's digital certificate that identifies a sender; and
verify that the signed message originated from the sender by at least:
validating a message signature on the signed message using a public key associated with the sender's digital certificate; and
validating the sender's digital certificate using the digital certificate.

19. The non-transitory computer-readable storage medium of claim 13, wherein the instructions further comprise instructions that, as a result of being executed by the one or more processors, cause the computer system to:
initiate a TLS session with an online service;
receive an online service's digital certificate from the online service; and
validate the online service's digital certificate using the digital certificate.

20. The non-transitory computer-readable storage medium of claim 13, wherein the instructions further comprise instructions that, as a result of being executed by the one or more processors, cause the computer system to add the digital certificate to a collection of pinned digital certificates maintained in a certificate store, the certificate store being accessible to the computer system.

* * * * *